United States Patent
Sun et al.

(10) Patent No.: US 12,231,300 B2
(45) Date of Patent: Feb. 18, 2025

(54) HETEROGENEOUS GRAPH LEARNING-BASED UNIFIED NETWORK REPRESENTATION

(71) Applicant: Cisco Technology, Inc., San Jose, CA (US)

(72) Inventors: Pengfei Sun, Reno, NV (US); Qihong Shao, Clyde Hill, WA (US); David C. White, Jr., St. Petersburg, FL (US)

(73) Assignee: CISCO TECHNOLOGY, INC., San Jose, CA (US)

(*) Notice: Subject to any disclaimer, the term of this patent is extended or adjusted under 35 U.S.C. 154(b) by 64 days.

(21) Appl. No.: 18/334,735

(22) Filed: Jun. 14, 2023

(65) Prior Publication Data
US 2024/0422069 A1    Dec. 19, 2024

(51) Int. Cl.
| | |
|---|---|
| *G06F 15/16* | (2006.01) |
| *H04L 41/12* | (2022.01) |
| *H04L 41/14* | (2022.01) |
| *H04L 41/16* | (2022.01) |

(52) U.S. Cl.
CPC .......... *H04L 41/145* (2013.01); *H04L 41/12* (2013.01); *H04L 41/16* (2013.01)

(58) Field of Classification Search
CPC ........ H04L 41/12; H04L 41/16; H04L 41/145
USPC ...................................................... 709/238
See application file for complete search history.

(56) References Cited

U.S. PATENT DOCUMENTS

| | | | | |
|---|---|---|---|---|
| 7,788,210 B2* | 8/2010 | Lang | ...................... | G06Q 30/02 |
| | | | | 706/59 |
| 7,948,433 B2* | 5/2011 | Seatovic | ............... | G01S 19/073 |
| | | | | 342/357.52 |
| 9,426,233 B2* | 8/2016 | Zhang | ................... | H04L 67/535 |
| 9,439,053 B2* | 9/2016 | Abraham | ................ | H04W 4/21 |
| 9,760,619 B1* | 9/2017 | Lattanzi | ................ | G06F 16/285 |

(Continued)

FOREIGN PATENT DOCUMENTS

| | | |
|---|---|---|
| CN | 113569906 A | 10/2021 |

OTHER PUBLICATIONS

Jing Yang, et al., "Tensor Graph Attention Network for Knowledge Reasoning in Internet of Things," IEEE Internet of Things Journal, vol. 9, No. 12, Jun. 15, 2022, 10 pages.

(Continued)

*Primary Examiner* — Moustafa M Meky

(74) *Attorney, Agent, or Firm* — Edell, Shapiro & Finnan, LLC

(57) ABSTRACT

A heterogeneous graph learning system generates and analyzes network implementations. The heterogeneous graph learning system includes obtaining information describing multiple network implementations including heterogeneous nodes. The heterogeneous graph learning system also includes generating a one-hop graph connecting a particular node of the heterogeneous nodes with a set of related nodes. The one-hop graph connects the particular node with the set of related nodes via corresponding edges. The heterogeneous graph learning system further includes transforming the one-hop graph into a weighted graph based on a Dynamic Meta Path Transformation (DMPT). In the DMPT, each of the corresponding edges connecting the particular node to a corresponding related node among the set of related nodes is associated with a corresponding weight.

20 Claims, 16 Drawing Sheets

(56) References Cited

U.S. PATENT DOCUMENTS

| | | | |
|---|---|---|---|
| 10,693,739 | B1 | 6/2020 | Naseri et al. |
| 11,030,264 | B2* | 6/2021 | Schoenberg ............ H04L 63/08 |
| 11,108,802 | B2* | 8/2021 | Cherkasov .......... H04L 63/1425 |
| 11,176,412 | B2* | 11/2021 | Nie ....................... G06F 18/211 |
| 11,258,879 | B2* | 2/2022 | Ioannidis ................ H04L 67/63 |
| 11,347,797 | B2* | 5/2022 | Grossman ........... H04L 61/5007 |
| 11,531,902 | B2* | 12/2022 | Horesh .................. G06N 3/048 |
| 11,574,011 | B2* | 2/2023 | Bhowan .............. G06F 16/9024 |
| 11,625,580 | B2* | 4/2023 | Wortsman ................ G06N 3/06 706/25 |
| 11,683,237 | B2* | 6/2023 | Pronk ..................... H04L 41/22 709/224 |
| 11,922,162 | B2* | 3/2024 | A .............................. G06F 8/65 |
| 11,991,213 | B2* | 5/2024 | Batson .................. H04L 41/069 |
| 11,995,568 | B2* | 5/2024 | Toubiana ............... G16B 40/20 |
| 2020/0137192 | A1* | 4/2020 | Ioannidis ............. H04L 45/127 |
| 2021/0192370 | A1* | 6/2021 | Toubiana ............... G16B 40/00 |
| 2021/0201198 | A1 | 7/2021 | Li et al. |
| 2021/0279615 | A1 | 9/2021 | Latapie et al. |
| 2022/0180201 | A1* | 6/2022 | Sarshogh .................. G06N 3/084 |
| 2022/0269936 | A1 | 8/2022 | Zhu et al. |
| 2022/0334280 | A1* | 10/2022 | Montouchet .......... G01V 1/302 |
| 2022/0383036 | A1* | 12/2022 | Nazi ....................... G06F 18/22 |
| 2023/0053859 | A1* | 2/2023 | Zhu .................... G06Q 30/0631 |
| 2023/0267317 | A1* | 8/2023 | Shin ..................... G06N 3/0499 706/17 |
| 2023/0281430 | A1* | 9/2023 | Sinop .................. G06N 3/0455 706/15 |
| 2023/0362175 | A1* | 11/2023 | Li .......................... H04L 41/16 |

OTHER PUBLICATIONS

Weiwei Jiang, "Graph-based Deep Learning for Communication Networks: A Survey," IEEE, arXiv:2106.02533v2 [cs.NI], Dec. 22, 2021, 56 pages.

Yuwei Cao, et al., "Knowledge-Preserving Incremental Social Event Detection via Heterogeneous GNNs," Proceedings of the Web Conference 2021 (WWW '21), arXiv:2101.08747v2 [cs.LG], Feb. 13, 2021, 12 pages, https://doi.org/10.1145/3442381.3449834.

Yali Gao, et al., "HinCTI: A Cyber Threat Intelligence Modeling and Identification System Based on Heterogeneous Information Network," IEEE Xplore, downloaded on Mar. 27, 2021, 14 pages.

Hao Peng, et al., "Streaming Social Event Detection and Evolution Discovery in Heterogeneous Information Networks," ACM Transactions on Knowledge Discovery, vol. 15. No. 15, Article, Publication date: May 2021, 33 pages.

Chuan Shi, et al., "Deep Collaborative Filtering with Multi-Aspect Information in Heterogeneous Networks," IEEE, arXiv:1909.06627v1 [cs.IR], Sep. 14, 2019, 12 pages.

Liangwei Yang, et al., "Large-scale Personalized Video Game Recommendation via Social-aware Contextualized Graph Neural Network," Proceedings of the ACMWeb Conference 2022 (WWW '22), Apr. 25-29, 2022, 11 pages, https://doi.org/10.1145/3485447.3512273.

Ziniu Hu, et al., "Heterogeneous Graph Transformer," Proceedings of the Web Conference 2020 (WWW '20), Apr. 20-24, 2020, 7 pages, https://doi.org/10.1145/3366423.3380027.

Zongtao Liu, "Heterogeneous Graph Neural Networks for Large-Scale Bid Keyword Matching," Proceedings of the 30th ACM International Conference on Information and Knowledge Management (CIKM '21), arXiv:2111.00926v1 [cs.IR], Nov. 1, 2021, 10 page, https://doi.org/10.1145/3459637.3481926.

Liyuan Zheng, et al., "Heterogeneous Graph Neural Networks with Neighbor—SIM Attention Mechanism for Substitute Product Recommendation," 2021, 7 pages.

Oleksandr Ferludin, et al. "TF-GNN: Graph Neural Networks in TensorFlow," arXiv:2207.03522v1 [cs.LG], Jul. 7, 2022, 18 pages.

* cited by examiner

HETEROGENEOUS GRAPH LEARNING-BASED UNIFIED NETWORK REPRESENTATION

TECHNICAL FIELD

The present disclosure generally relates to computer networks and systems.

BACKGROUND

A conventional knowledge graph typically allows a node-edge pair to deductively and inductively extend the underlying knowledge to discover an answer relying on explicit relations. However, due to the restriction on the graph representation approach, it is particularly challenging to extract the semantic context and learn the representation of a subgraph.

Graph neural networks, as a powerful graph representation technique based on deep learning, shows good performance for multiple downstream tasks. However, graph neural networks generally, and heterogeneous graph neural networks specifically, are not typically applied in the domain of network deployments. The heterogeneity among nodes and edges challenges the multi-hop semantic context learning and graph representation. Using a meta-path composite relation connecting pairs of nodes are typically used for capturing the relevant semantics of the two nodes. Heterogeneous graphs have generally been used for abstracting and modeling complex systems, such as Internet of Things (IoT), cyber security, social event detection, and recommendation systems.

DETAILED DESCRIPTION

Overview

The techniques presented herein provide for a computer-implemented method for using a heterogeneous graph learning model to generate and analyze network implementations. The method includes obtaining information describing a plurality of network implementations, including a heterogeneous plurality of nodes. The method also includes generating a one-hop graph connecting a particular node of the heterogeneous plurality of nodes with a set of related nodes of the heterogeneous plurality of nodes. The one-hop graph connects the particular node with the set of related nodes via corresponding edges. The method further includes transforming the one-hop graph into a weighted graph based on a Dynamic Meta Path Transformation (DMPT). In the DMPT, each of the corresponding edges connecting the particular node to a corresponding related node among the set of related nodes is associated with a corresponding weight.

Example Embodiments

Figure 1:
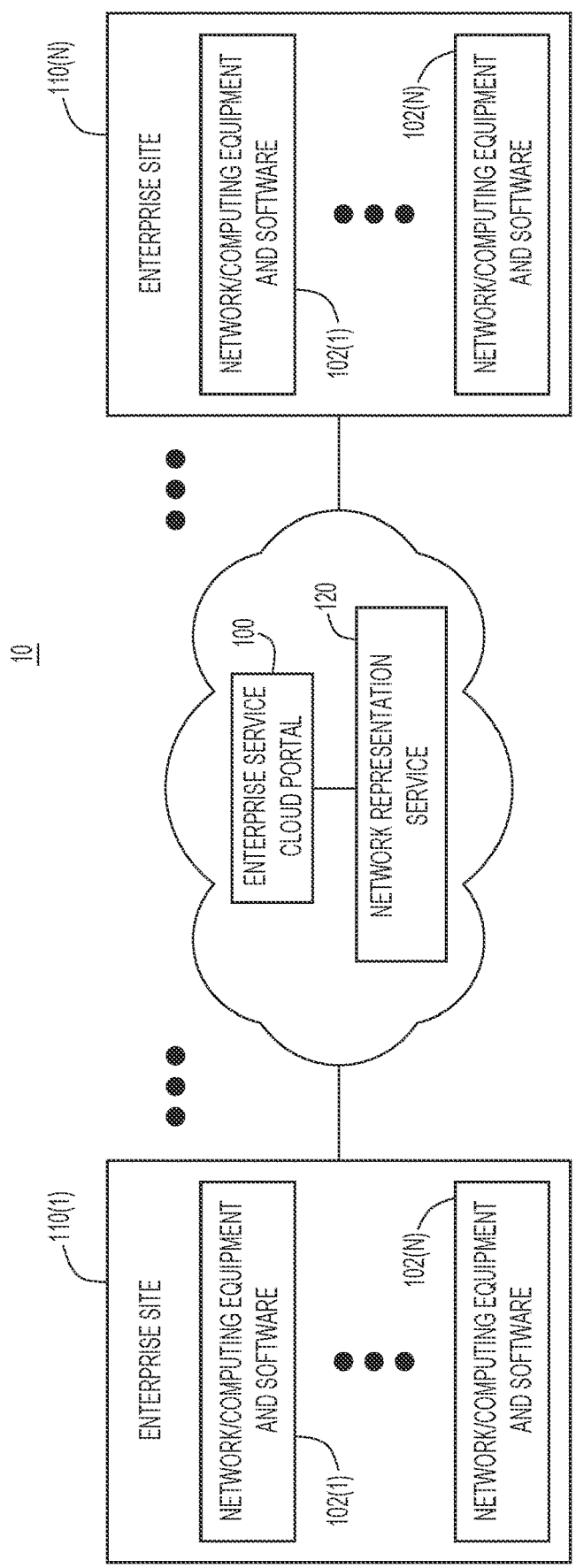
FIG. 1 is a block diagram of a system that includes a network representation service that interacts with an enterprise service cloud portal and network/computing equipment and software residing at various enterprise sites of an enterprise network domain, according to an example embodiment.

FIG. 1 is a block diagram of a system 10 that includes a network representation service 120 that interacts with an enterprise service cloud portal (cloud portal) 100 and network/computing equipment and software 102(1)-102(N) residing at various enterprise sites 110(1)-110(N), or in cloud deployments of an enterprise, according to an example embodiment.

The notations 1, 2, 3 . . . n; a, b, c, . . . n; "a-n", "a-d", "a-f", "a-g", "a-k", "a-c", and the like illustrate that the number of elements can vary depending on a particular implementation and is not limited to the number of elements being depicted or described. Moreover, this is only examples of various components, and the number and types of components, functions, etc. may vary based on a particular deployment and use case scenario.

The system 10 is one example of an enterprise network. The system 10 may involve multiple enterprise networks. The network/computing equipment and software 102(1)-102(N) are resources or assets of an enterprise (the terms "assets" and "resources" are used interchangeably herein).

The network/computing equipment and software 102(1)-102(N) may include any type of network devices or network nodes such as controllers, access points, gateways, switches, routers, hubs, bridges, gateways, modems, firewalls, intrusion protection devices/software, repeaters, servers, and so on. The network/computing equipment and software 102(1)-102(N) may further include endpoint or user devices such as a personal computer, laptop, tablet, and so on. The network/computing equipment and software 102(1)-102(N) may include virtual nodes such as virtual machines, containers, point of delivery (PoD), and software such as system software (operating systems), firmware, security software such as firewalls, and other software products. The network/computing equipment and software 102(1)-102(N) may be in a form of software products that reside in an enterprise network and/or in one or more cloud(s). Associated with the network/computing equipment and software 102(1)-102(N) is configuration data representing various configurations, such as enabled and disabled features. The network/computing equipment and software 102(1)-102(N), located at the enterprise sites 110(1)-110(N), represent information technology (IT) environment of an enterprise.

The enterprise sites 110(1)-110(N) may be physical locations such as one or more data centers, facilities, or buildings located across geographic areas that designated to host the network/computing equipment and software 102(1)-102(N). The enterprise sites 110(1)-110(N) may further include one or more virtual data centers, which are a pool or a collection of cloud-based infrastructure resources specifically designed for enterprise needs, and/or for cloud-based service provider needs. Each enterprise site is a network domain, according to one example embodiment.

The network/computing equipment and software 102(1)-102(N) may send to the cloud portal 100, via telemetry techniques, data about their operational status and configurations so that the cloud portal 100 is continuously updated about the operational status, configurations, software versions, etc. of each instance of the network/computing equipment and software 102(1)-102(N) of an enterprise.

The cloud portal 100 is driven by human and digital intelligence that serves as a one-stop destination for equipment and software of an enterprise to access insights and expertise when needed and specific to a particular stage of an adoption lifecycle. Examples of capabilities include assets and coverage, cases (errors or issues to troubleshoot), automation workbench, insights with respect to various stages of an adoption lifecycle and action plans to progress to the next stage, etc. The cloud portal 100 helps the enterprise network technologies to progress along an adoption lifecycle based on adoption telemetry and enabled through contextual learning, support content, expert resources, and analytics and insights embedded in context of the enterprise's current/future guided adoption tasks.

Network implementations are complicated, heterogeneous combinations of hardware devices, local and remote services, software packages, and licenses. An organization may purchase various network devices, design/deploy different network topologies, and request different services to optimize their network operation for their specific business needs. When facing large-scale network deployment, the portfolio management of heterogeneous products and services presents challenges, such as business-driven hardware allocations, utilization-based resource optimization, peer-experience learning-based recommendations, and customized service-related solutions (e.g., security solution recommendations).

The techniques presented herein address these network management issues with a foundation based on a powerful graph representation that reflects intrinsic characteristics and semantic contexts of the heterogeneous network. The learned network representation may quantitatively measure the value of certain hardware in the network topology. The network representation may also embed multi-dimensional peer knowledge to implement transfer learning. For instance, based on a heterogeneous graph of network data, the network representation may incorporate security best practices, issue detection, and solution recommendation, since network security involves multiple agents, hardware, and software. The Heterogeneous Graph Learning (HGL) system described herein obtains an organization-specific network representation by extracting and aggregating neighborhood information, which may serve multiple downstream tasks is different use cases.

Figure 2:
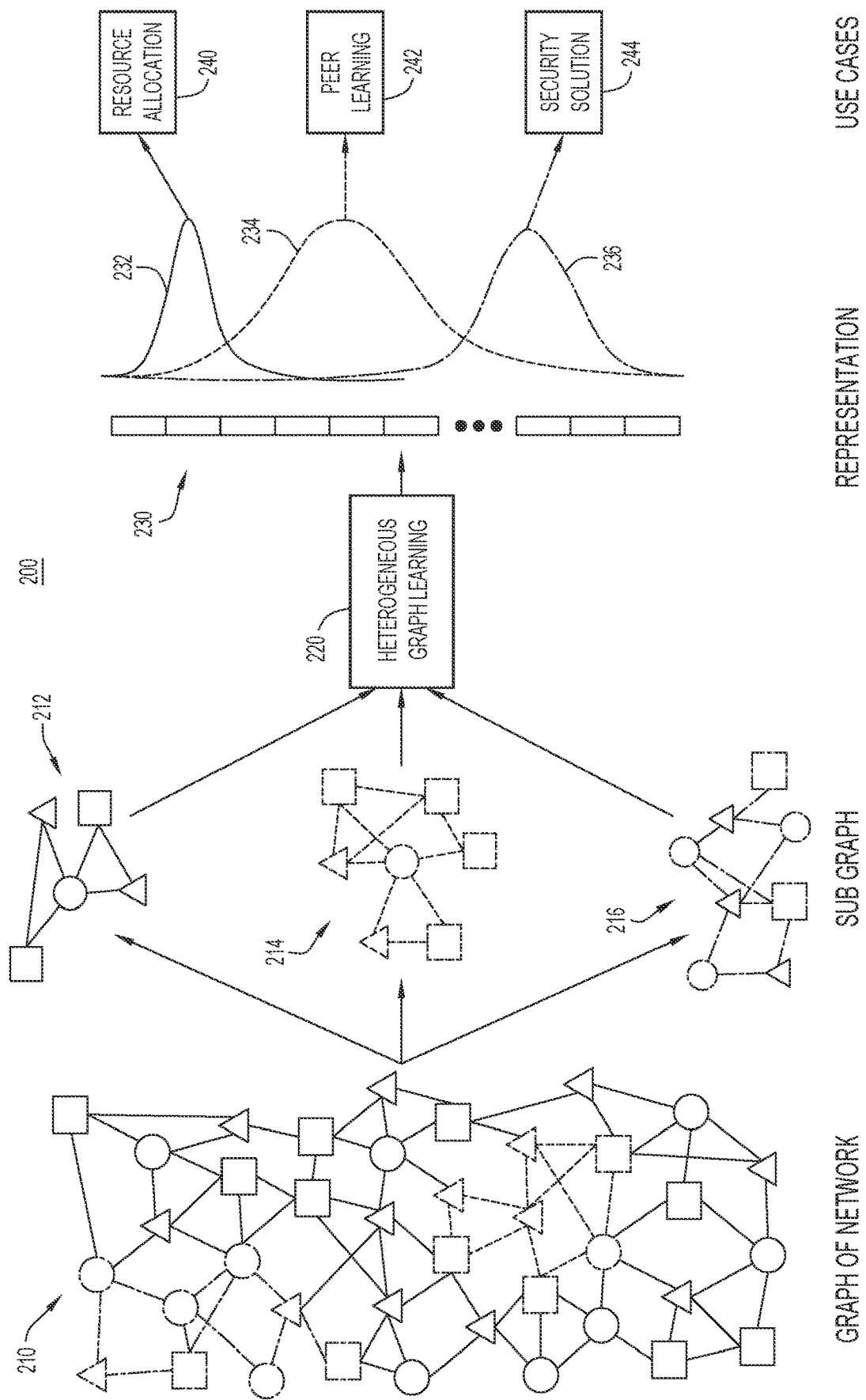
FIG. 2 is a diagram illustrating an overview of the network representation service and use cases for the network representation service, according to an example embodiment.

Referring now to FIG. 2, a network representation system 200 for extracting information from various network implementations to generate actionable recommendations across different areas of knowledge. The system 200 includes a graph 210 of network data. The graph 210 includes subgraphs 212, 214, and 216 as part of the overall graph 210.

In one example, the graph 210 may include multiple network implementations spanning multiple organizations. Additionally, the graph 210 may include nodes representing different types of information (e.g., device information, software information, organizational information, etc.).

In another example, the subgraphs 212, 214, and 216 focus on the network information describing one particular aspect of the graph 210, such as a specific organization or a specific device. The subgraphs 212, 214, and 216 include any nodes that affect the central focus of the respective subgraph. For instance, the subgraph 212 may be associated with a specific model of a network device as the central focus and includes nodes associated with software licenses used by that network device model, organizations that use that device model, and/or services that use that device model.

A trained Heterogeneous Graph Learning (HGL) model 220 processes the subgraphs 212, 214, and 216 to generate output results 230. The output results 230 include results 232, 234, and 236 that describe the proximity of other nodes to the central nodes of subgraphs 212, 214, and 216, respectively. Based on the results 232, 234, and 236, the system 200 generates recommendations for tasks 240, 242, and 244, respectively.

In one example, the HGL model 220 may incorporate a dynamic meta-path transformation to apply prior knowledge and improve the performance of the HGL model 220. Additionally, the HGL model 220 may include soft subgraph clustering to utilize neighbor graph context information. The HGL model 220 may obtain high expressiveness graph representation to extract the organization-dependent network patterns and facilitate multiple downstream tasks in the network domain.

In one specific example, the task 240 is a resource allocation and cost optimization task. Within a given budget, maximizing the overall infrastructure capacity and optimizing the utilization of each device and license present challenges at a macro level and a micro level. The output results 230 numerically reflect the usage, data load, and connections for each device and license. Additionally, the inter-relation aggregation of the heterogeneous graph 210 allows the learned output results 230 to inherently incorporate the network context. The output results 232 resulting from processing the subgraph 212 that is associated with a network device may be used for resource allocation in support of that device.

In another specific example, the task 242 is a peer-experience transfer task that allows an organization to benefit from the knowledge of how networks are implemented by other organizations. Organizations may be eager to leverage the experiences of the peers, including experience with network deployment, solutions for network failure, or infrastructure optimization. The output results 234 generated by processing the subgraph 214, which is focused on an organization node extracts similar patterns from all connected network products and services in the graph 210. Through similarity comparisons among the output results 230, the system 200 can transfer experience from one organization to another organization regarding different perspectives of the network graph 210.

In a further specific example, the task 244 may be related to security solutions, such as best practices, issue detection, and solution recommendation. When security issues arise within certain network contexts, the system 200 may provide an alert, which reduces the financial cost and increases the security of the network infrastructure. The system 200 combines the heterogeneous structure of devices, software, and security-related reports to extract both intra-relations and inter-relations from the semantic contexts. The output results 236 generated by processing the subgraph 216, which may be focused on a security service, may be used to automatically detect patterns of security issues and recommend solutions according to the similarity of the output results 230.

The system 200 is shown for application in the tasks 240, 242, and 244, but other tasks may also be addressed with the network representation encoded in the heterogeneous graph learning model 220. The specific use cases associated with the tasks 240, 242, and 244 are described in more detail with respect to FIGS. 10-12, respectively.

Figure 3:
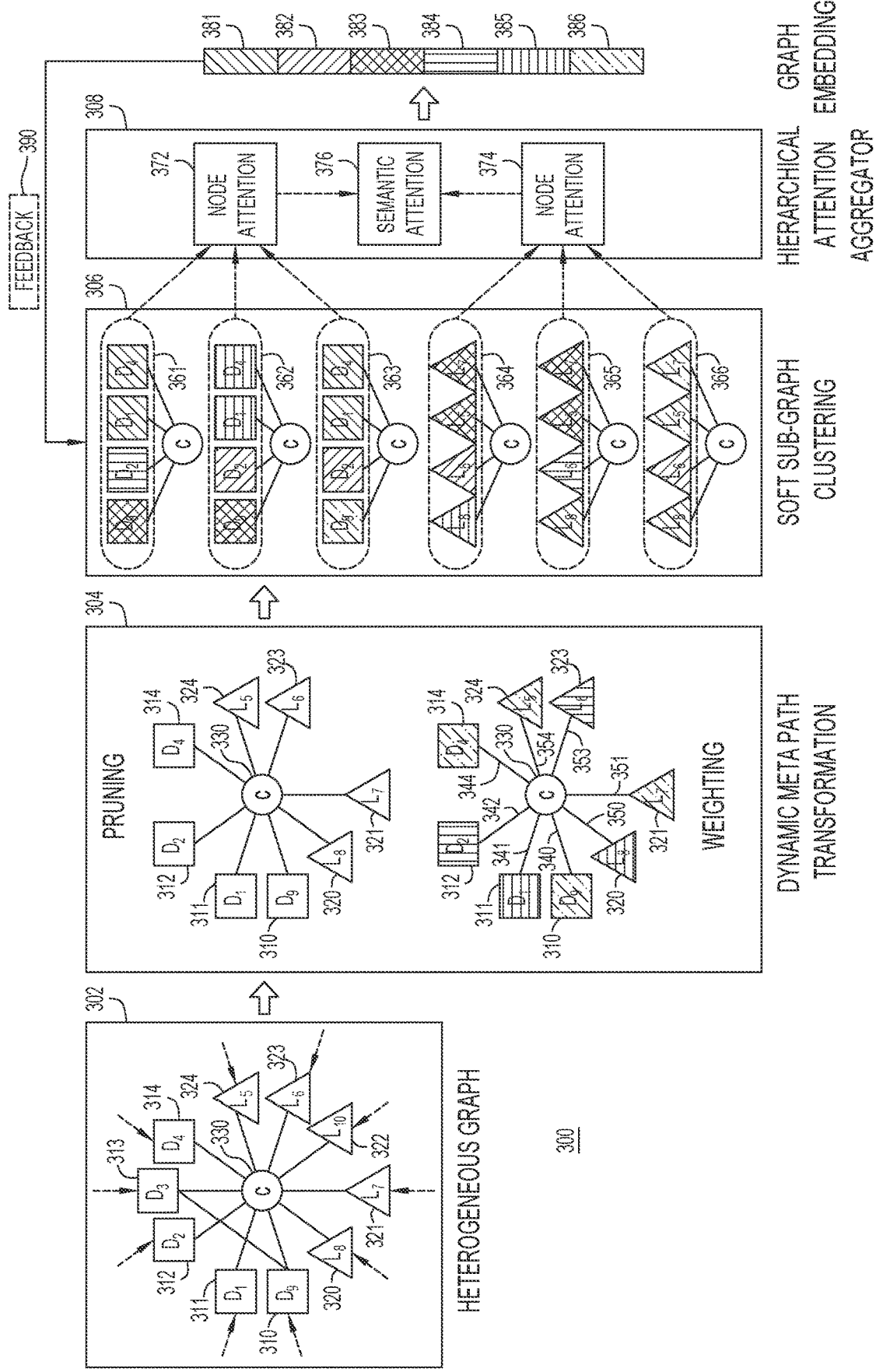
FIG. 3 is a block diagram illustrating a heterogeneous graph learning model, according to an example embodiment.

Referring now to FIG. 3, a high-level architectural design of an HGL model 300 is shown. The HGL model 300 begins with a heterogeneous graph 302 that is processed by a Dynamic Meta-Path Transformation (DMPT) module 304, a Soft Subgraph Clustering (SSC) module 306 and Hierarchical Attention Aggregator (HAA) module 308. The heterogeneous graph 302 includes device nodes 310, 311, 312, 314, 313, and 314, software license nodes 320, 321, 322, 323, and 324, and organization node 330. Each of the device nodes 310-314 and the license nodes 320-324 have a connection to the organization node 330. For clarity, the device nodes 310-314 are depicted as squares, the license nodes 320-324 are depicted as triangles, and the organization node 330 is depicted as a circle.

The DMPT module 304 uses prior knowledge about network operations to prune redundant nodes and graph connections, which reduces the dimensionality of the network representation. For instance, the DMPT module 304 may determine that device node 313 performs similar functions to device node 314 and the license node 322 shares most/all of the features of license node 323. In this instance, the DMPT module 304 prunes the device node 313 and the license node 322 from further processing.

After pruning the similar/redundant nodes 313 and 322, the DMPT module 304 determines weights for each of the remaining nodes, i.e., device nodes 310, 311, 312, and 314, and license nodes 320, 321, 323, and 324, with respect to the organization node 330. The weights of each node with respect to the organization node 330 is associated with the edge that connects the corresponding node to the organization node 330. In other words, the weight of the device node 310 with respect to the organization node 330 is associated with the edge 340. Similarly, the weight of the nodes 311, 312, 314, 320, 321, 323, and 324 with respect to the organization node 330 is associated with the edges 341, 342, 344, 350, 351, 353, and 354, respectively. The operation of the DMPT module 304 is described in more detail with respect to FIG. 4 and FIG. 5.

In one example, different nodes/edges may have different weights in the network topology. For instance, core devices are typically more important to an organization's network deployment than peripheral devices, and the core device nodes may be assigned a higher weight accordingly. This use of prior knowledge on network operations differentiates the network-based HGL model 300 from heterogeneous graphs in other business fields.

The DMPT module 304 provides the pruned/weighted subgraphs to the SSC module 306, which adjusts the weights of each node/edge based on shared nodes with other subgraphs. The SSC module 306 compares the device node sets 361, 362, and 363 and determines whether to adjust the weights of any edge in one of the subgraphs based on a shared device node with another subgraph. Additionally, the SSC module 306 compares the license node sets 364, 365, and 366 and determines whether to adjust the weights of any edge in one of the subgraphs based on a shared license node with another subgraph. In comparison to the standard heterogeneous graph methodology of hard splitting the graph based on the node type and preset similarity values only, the SSC module 306 retains as much network connection as possible when adjusting weights to emphasize the significance in the context information. The operation of the SSC module 306 is described in more detail with respect to FIG. 6.

In one example, the HGL model 300 uses the DMPT module 304 and the SSC module 306 to capture both node-wise features (e.g., device-to-device connections and organization-to-device connections) and graph-wise features (e.g., organization-to-multiple-devices/licenses and organization-to-organization).

After processing the initial heterogenous graph 302 with the DMPT module 304 and the SSC module 306, the HGL model 300 uses the HAA module 308 to derive graph embeddings that describe the network system. The HAA module 308 includes node attention modules 372 and 374 that capture patterns between nodes and semantic attention module 376 that captures broader patterns between subgraphs. The HAA module 308 aggregates node and semantic contexts and produces graph embedding output results 381, 382, 383, 384, 385, and 386 that represents the target node for multiple downstream tasks (e.g., network resource allocation, peer knowledge transfer, network security recommendation, etc.).

In one example, the individual output results 381-386 may each describe the similarity between the organization node 330 and one of the other nodes (e.g., device node 310, license node 320, etc.) in the heterogeneous graph 302. In another example, the output results 381-386 may also be provided as feedback 390 to the SSC module 306 to further refine the weights of edges between different nodes.

DMPT: Dynamic Meta Path Transformation

Multiple factors distinguish network-related graphs from other application scenarios, such as social media graphs, e-commerce shopping graphs, and health care graphs. A network graph may be built on a very large knowledge database, in which domain priors may significantly affect the graph weights and distribution across nodes/edges. The relatively large number of feature attributes attached to an organization (e.g., business contexts), network hardware (e.g., device model, functionality, role, etc.), and network software (e.g., terms and utilization of software licenses) challenges how well a network graph can represent the actual network implementation and extract patterns.

Figure 4:
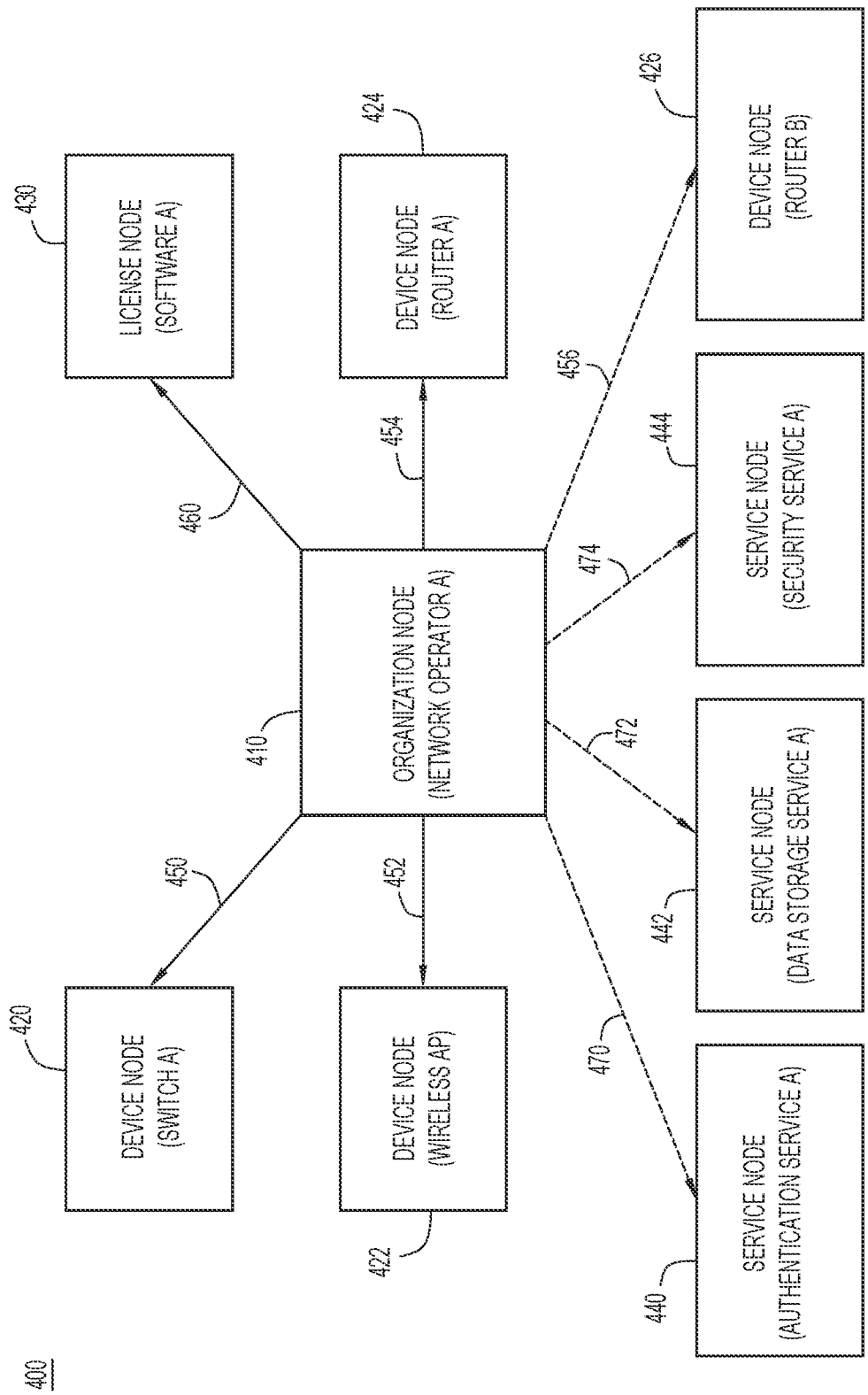
FIG. 4 is a block diagram illustrating a one-hop graph centered on an organization, according to an example embodiment.

Referring now to FIG. 4, a block diagram illustrates an example subgraph 400 that shows variations between node pairs that affect the HGL model. In the subgraph 400, the organization node 410 connects to device nodes 420, 422, 424, and 426, license node 430, and service nodes 440, 442, and 444. The device nodes 420, 422, 424, and 426 are connected to the organization node 410 by edges 450, 452, 454, and 456, respectively. Similarly, the license node 430 is connected to the organization node 410 by the edge 460. The service nodes 440, 442, and 444 are connected to the organization node 410 by edges 470, 472, and 474, respectively.

Among these connections, different weights across the edges may reflect the roles of the corresponding node in the network topology. For instance, the device nodes 420, 422, and 424 may be important in the network topology and the edges 450, 452, and 454 are associated with a relatively high weight. Similarly, the license node 430 may be important to the network of the organization, and the edge 460 is associated with a high weight.

In contrast, the device node 426 may be less important to the network topology and the edge 456 is associated with a relatively lower weight. For instance, the device node 426 may represent a legacy switch that provides access to long-term storage devices that are used for a monthly data backup. The administrators of the organization represented by the organization node 410 may indicate that the monthly data backup is not a high priority, leading to the low priority of the edge 456. Similarly, the service nodes 440, 442, and 444 may represent relatively low priority services, and the corresponding edges 470, 472, and 474 are weighted lower, accordingly. The weighting of the edges between nodes helps the organization to indicate a priority for problems and solutions.

Unlike general heterogeneous graph that directly groups the nodes/edges as input features, the techniques presented herein for a network heterogeneous graph that adjusts the weights of the edges between nodes. Specifically, the network heterogeneous graph model described herein leverages a DMPT module to merge and redistribute weights among nodes and edges based on network domain knowledge and input from the organizations using the network heterogeneous graph model. In another example, the DMPT module may be used as a transformation for other neural network models that are not heterogeneous graph models.

Figure 5:
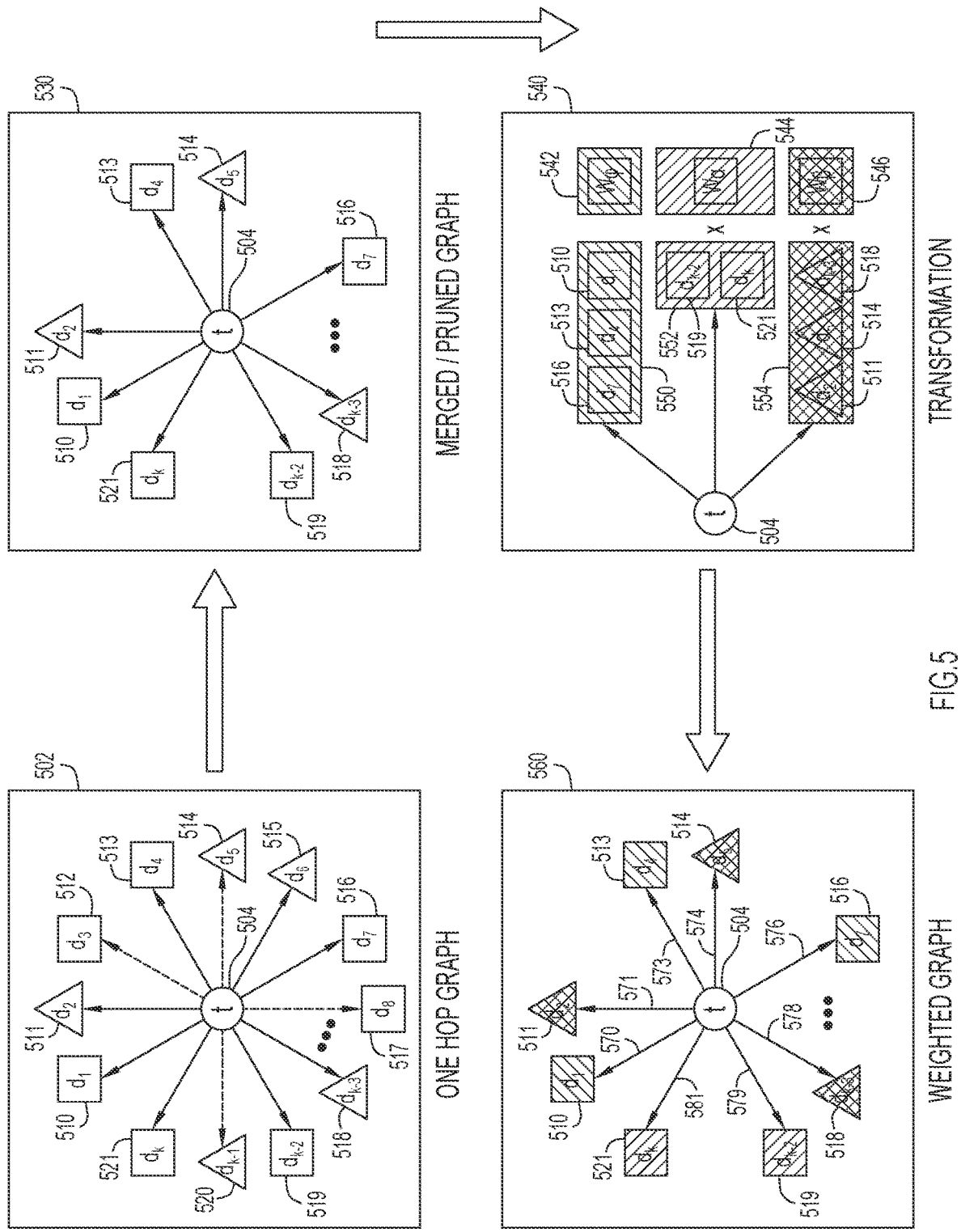
FIG. 5 is diagram illustrating a Dynamic Meta-Path Transformation (DMPT) in the heterogeneous graph learning model, according to an example embodiment.

Referring now to FIG. 5, a flow diagram illustrates an example of the DMPT module processing a subgraph of a heterogeneous network representation. The subgraph starts as a one-hop graph 502 with a central node 504. The central node 504 is connected to a heterogeneous set of nodes including nodes 510-521. Maintaining the convention of depicting device nodes as squares, license nodes as triangles, and organization nodes as circles, the central node 504 is an organizational node, the nodes 510, 512, 513, 516, 517, 519, and 521 are device nodes, and the nodes 511, 514, 515, 518, and 520 are license nodes. In one example, the DMPT module may also process multi-hop subgraphs.

The DMPT module first processes the one-hop graph 502 at 530 by merging and pruning connections that are redundant or share enough similarity with another connection that little information is lost by removing one of the connections. For instance, device nodes 512 and 513 may be different models of network switches that differ only in features (e.g., supporting legacy standards) that are not used by the organization node 504. In another instance, the license nodes 514 and 515 may be the same type of software license that were purchased at different times. By pruning redundant connections and merging nodes with overlapping functions/features from the one-hop graph 502, the DMPT module reduces the dimensionality of the one-hop graph while maintaining the significant patterns in the graph data. In the example of FIG. 5, the device nodes 512 and 517 are removed, and the license nodes 515 and 520 are removed.

After the meta path merge/prune 530, the DMPT module introduces node-type-specific weighting in a transformation 540. The transformation matrices 542, 544, and 546 incorporate domain knowledge about the different node types and weights the edges connecting each node type to the organization node 504 according to the priorities of the organization node 504. The nodes are grouped into node types 550, 552, and 554, and provided an initial weight by the transformation matrices 542, 544, and 546, respectively.

In one example, the transformation matrices 542, 544, and 546 may incorporate the quantities of devices, the network roles of the devices in the network topology, the business impact of certain security issues, the scope of failure cases, among other considerations. The transformation 540 emphasizes both the organization's subjective business interests and objective network knowledge and projects the features of each node into the same feature space. The transformation 540 may leverage the gradient descent approach to parameterizing the transformation matrices 542, 544, and 546. This enables data-driven modelling to initialize the transformation matrices 542, 544, and 546 with prior knowledge of network operations while adapting to the organization's emerging needs and individual network settings.

After applying the transformation 540, the DMPT module produces a weighted graph 560 with the central node 504 connected to the nodes 510, 511, 513, 514, 516, 518, 519, and 521 by weighted edges 570, 571, 573, 574, 576, 578, 579, and 581, respectively. In generating the weighted graph 560, the DMPT module dynamically adapts both prior knowledge-based pruning and transformation to the needs and inputs of the organization. For instance, the functionality of device node 512 and 513 that overlap for the organization node 504 may not be redundant for a different organization. The specific network environment and goals of different organizations with different business modes and interests may affect how the DMPT module prunes and transforms the heterogeneous graph data. In other words, the graph dimension reduction may be driven by the domain knowledge that is specific to an organization.

SSC: Soft Subgraph Clustering

Figure 6:
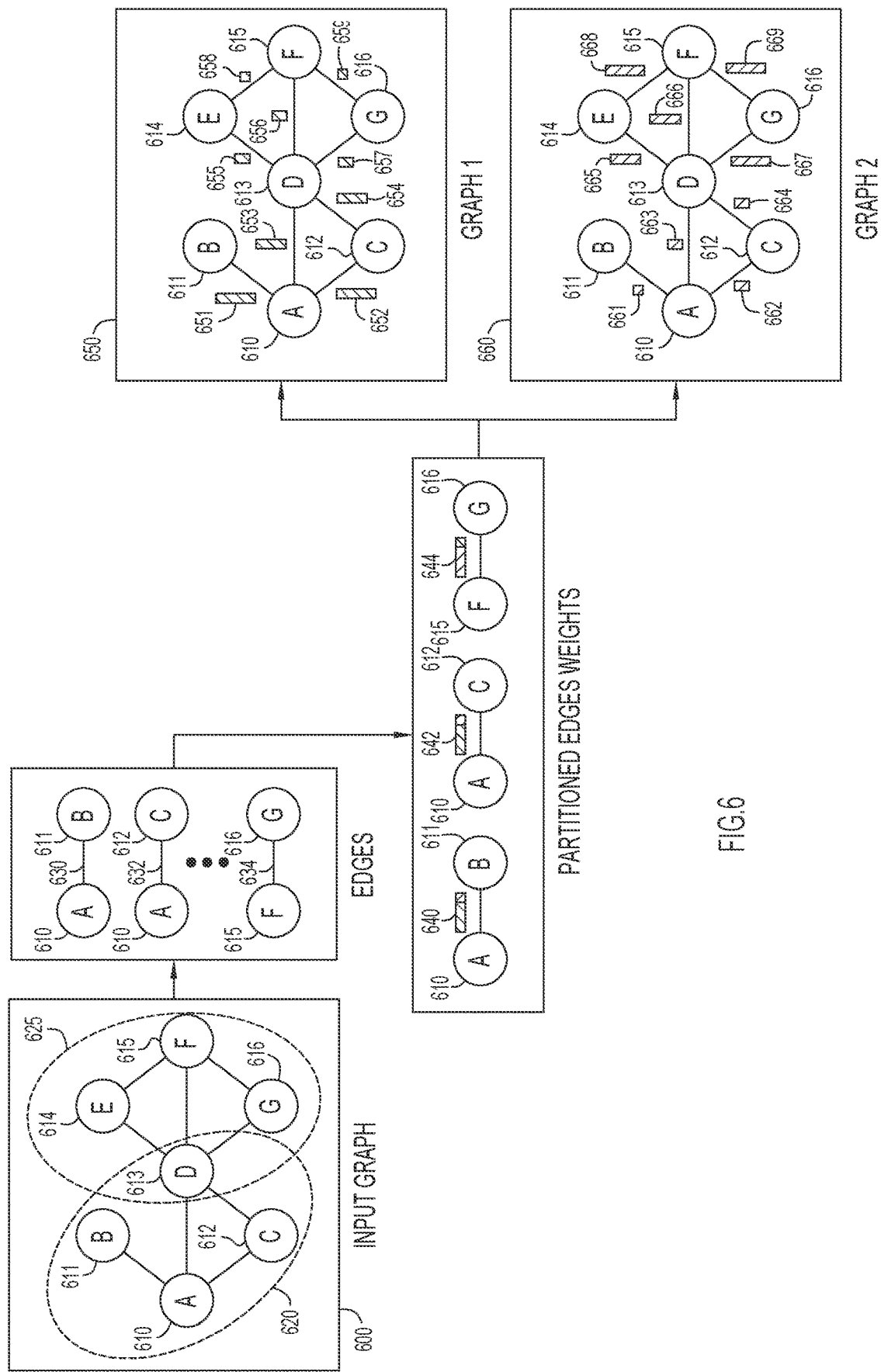
FIG. 6 is a diagram illustrating a Soft Subgraph Clustering (SSC) in the heterogeneous graph learning model, according to an example embodiment.

Referring now to FIG. 6, a flow diagram illustrates an example of the SSC module processing subgraphs that share a common node. The SSC module takes an input graph 600 that includes nodes 610-616 from overlapping subgraph 620 and subgraph 625. The subgraph 620 includes nodes 610, 611, 612, and 613. The subgraph 625 includes nodes 613, 614, 615, and 616. The node 613 is a shared node that connected to both subgraphs 620 and 625. Edges connect two nodes together, including edge 630 connecting node 610 to node 611, edge 632 connecting node 610 to node 612, and edge 634 connecting node 615 to node 616. Other edges are shown in the input graph 600, but only the shared node 613 is connected by edges in both subgraph 620 and subgraph 625.

The DMPT module sets an initial weight for each edge, as described with respect to FIG. 5, based on the domain knowledge and interest of the nodes operating within a single subgraph. The SSC module adjusts the edge weights by determining a partitioned edge weight that incorporates information from multiple subgraphs that share one or more common nodes. The SSC module determines the partitioned edge weight 640 between the node 610 and the node 611 to have a larger impact on subgraph 620 edges and a small impact on subgraph 625 edges. Similarly, the partitioned edge weight 642 between the node 610 and the node 612 also shows a large impact on the subgraph 620 edges and a relatively small impact on the subgraph 625 edges. In contrast, the partitioned edge weight 644 between the node 615 and the node 616 shows a relatively small impact on the subgraph 620 edges and a larger impact on the subgraph 625 edges.

The SSC module combines the partitioned edge weights (e.g., weights 640, 642, and 644) with the respective edge weights determined by the DMPT module to generate graphs 650 and 660 that quantify the effect of each node on the subgraph 620 and 625, respectively. Specifically, the graph 650 shows the adjusted weight 651 between node 610 and node 611, adjusted weight 652 between node 610 and node 612, adjusted weight 653 between node 610 and node 613, adjusted weight 654 between node 612 and node 613, adjusted weight 655 between node 613 and node 614, adjusted weight 656 between node 613 and node 615, adjusted weight 657 between node 613 and node 616, adjusted weight 658 between node 614 and node 615, and adjusted weight 659 between node 615 and node 616. Similarly, the graph 660 shows the adjusted weight 661 between node 610 and node 611, adjusted weight 662 between node 610 and node 612, adjusted weight 663 between node 610 and node 613, adjusted weight 664 between node 612 and node 613, adjusted weight 665 between node 613 and node 614, adjusted weight 666 between node 613 and node 615, adjusted weight 667 between node 613 and node 616, adjusted weight 668 between node 614 and node 615, and adjusted weight 669 between node 615 and node 616.

Consisting of text and knowledge bases, the heterogeneous network graph data represents various types of organizations, business fields, network topologies, and application scenarios. The imbalance and unique distribution among different subgraphs and interconnections may generate large variations that decrease a traditional graph model's accuracy in representing the network implementations. Unlike previous graph learning models that directly group the types of nodes to "hard split" the heterogeneous graph, the SSC module restricts the discrepancy among data nodes and connections, and reduces the impact of isolation of the semantic context driven by subgraph clustering.

As shown in FIG. 6, two subgraphs 620 and 625 may represent organizations and devices from different business sections, with the node 613 connecting the two subgraphs 620 and 625. Unlike the typical approach that directly splits the nodes/edges into subgraphs according to their types, the concept of a partitioned edge weight is introduced to softly determine the percentage of each node "belonging" to each subgraph. In the new subgraphs 650 and 660, all of the nodes and edges are included, but the edges are assigned different weights to reflect the relative impact on each of the original subgraphs 620 and 625.

In one example, an organization may include two departments, represented by subgraphs 620 and 625, that share network equipment, represented by the shared node 613. The semantic context, as a result of sharing network equipment, may be that network services and/or security issues are linked by the shared node 613. Hard splitting the two subgraphs 620 and 625 would remove the shared context and the learned network representation may lack the similarity and common solutions that could be applicable to both departments.

In another example, two organizations, represented by subgraphs 620 and 625, may share similar product purchasing activities, represented by the shared node 613, over a specified time period. For instance, the shared node 613 may represent a certain switch/router bundle or a security service that both organizations bought around the same time. Although both organizations may have no business involvement with each other, the graph connection indicating similar business interest and strategies may exist as a latent pattern.

Through the SSC module, the graph clusters retain intact graph connections and node sets, and the SSC module distributes different edge weights to each subgraph. The distributed weights narrow down the variations across subgraphs while obtaining global optimal values. The retained context from the intact graph connections facilitates pattern learning and improves the network representation generated by the HGL system.

In a further example, the edge weights may be initialized using domain knowledge or learned from the graph data. In general, node groups that are largely the same type should be assigned larger partitioned edge weights. In addition, the edge weighting may be learnable, i.e., as graph neural network weights. However, during the model training phase, a small learning rate may be assigned if the organization provides prior knowledge regarding the weights.

HAA: Hierarchical Attention Aggregator

Figure 7:
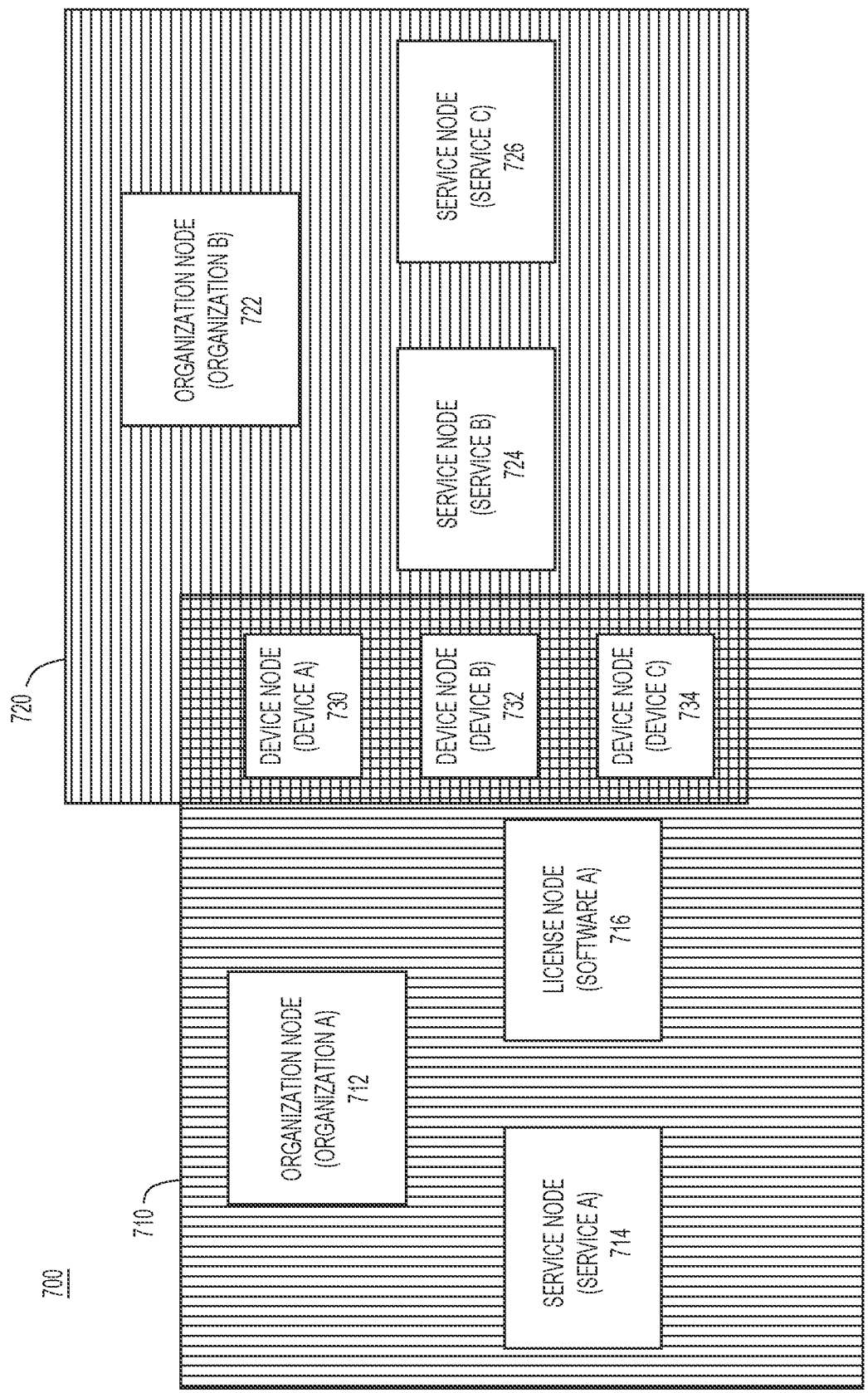
FIG. 7 is a block diagram illustrating two subgraphs with shared nodes, according to an example embodiment.

Referring now to FIG. 7, a simplified graph 700 of the network representation of two organizations is shown with overlapping subgraphs. The subgraph 710 includes an organization node 712, a service node 714, and a license node 716. The subgraph 720 includes an organization node 722, a service node 724, and a service node 726. Both subgraphs 710 and 720 include device nodes 730, 732, and 734. For simplicity in viewing, the edges connecting the nodes have been omitted from FIG. 7, but all of the nodes in the subgraph 710 are connected to the organization node 712, and all of the nodes in the subgraph 720 are connected to the organization node 722.

The subgraph features embed the localized correlations and contexts within the same type of node/edge data. Both of the subgraphs 710 and 720 include hardware nodes (e.g., device node 730) and software nodes (e.g., service node 714 and service node 724), and the SSC module projects the nodes/edges to the feature space based on their types (i.e., device, license, or service).

In addition, within the same type of grouped nodes/edges, each single node may have a different impact and unequal role from different perspectives. For instance, organization nodes 712 and 722 may be the same type of node, but may represent different types of people within the organization (e.g., a manager or an individual contributor). In another example, the nodes 724 and 726 may focus on security monitoring, while the nodes 714 and 716 may focus on cloud computing workloads. Although both sets of nodes are connected with the device nodes 730, 732, and 734, their respective functionalities and network load may differ significantly. The indirect connections represent semantic contexts with different roles in the network system that is quantitatively reflected in the network representation.

Figure 8:
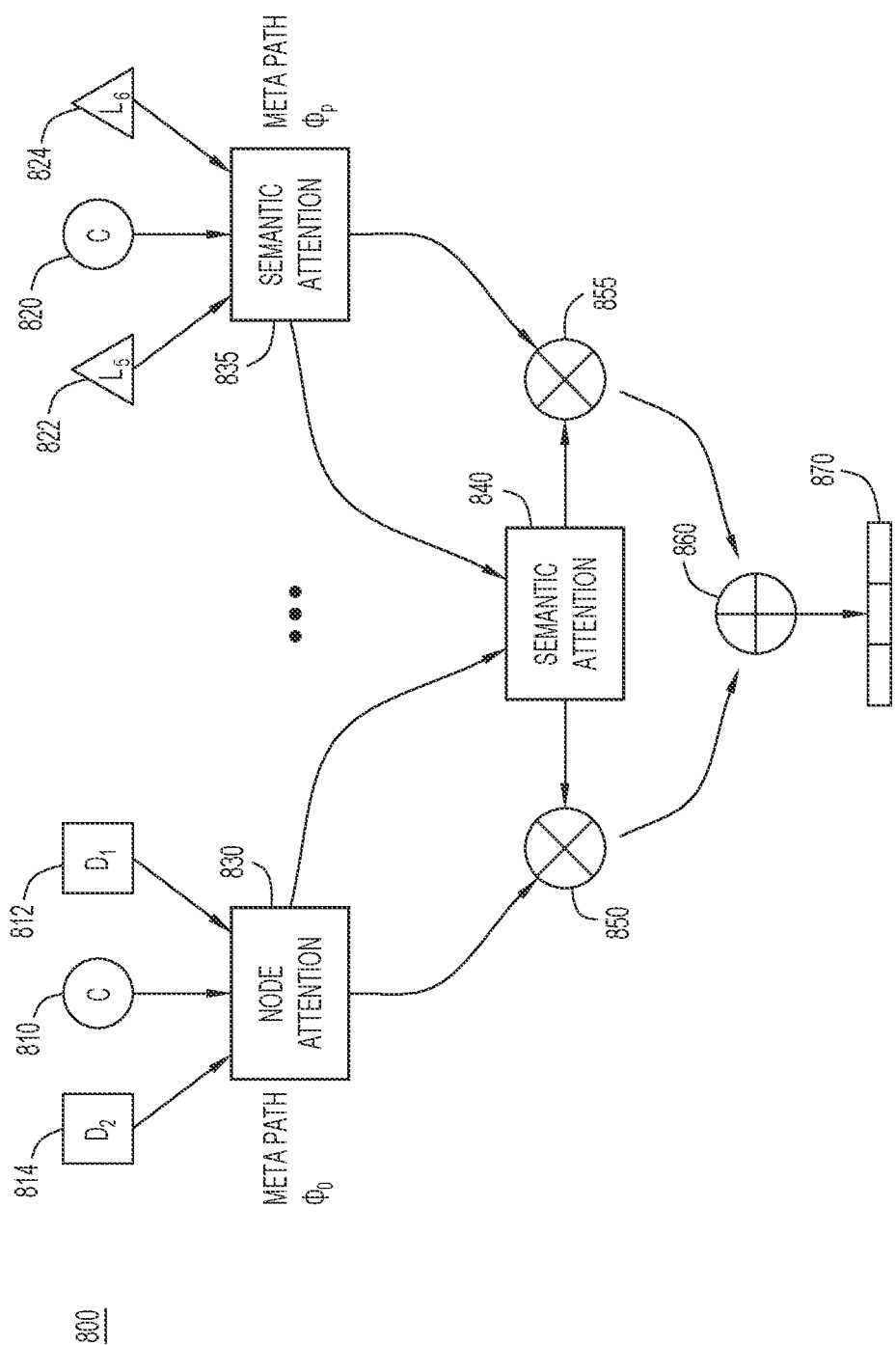
FIG. 8 is a diagram illustrating a Hierarchical Attention Aggregator (HAA) in the heterogeneous graph learning model, according to an example embodiment.

Referring now to FIG. 8, an HAA module 800 is shown to effectively learn the semantic context from heterogenous network data locally and globally by bringing together contexts from both node-wise and graph-wise features. The HAA module brings node weights 810, 812, and 814 from one subgraph into a node-level attention node 830. The HAA module also brings node weights 820, 822, and 824 from a second subgraph into a node-level attention node 835. Both of the node-level attention nodes 830 and 835 provide results to a semantic attention node 840. The results from the sematic attention node 840 modify the results from the node-level attention nodes 830 and 835 at the points 850 and 855, respectively. The modified results are combined at 860 to generate embeddings 870 that capture the patterns within each subgraph and the patterns between different subgraphs of the entire heterogeneous network graph.

The operation of the HAA module 800 not only ensembles the correlations/contexts from both node pairs (e.g., with attention nodes 830 and 835), but also learns the weights for different node connections and subgraphs (e.g., with semantic attention node 840). In other words, the HAA module 800 uses node-level attention to capture the major patterns and correlations in each individual subgraph, and semantic-level attention to emphasize the significant patterns between subgraphs. The hierarchical attention incorporated in the HAA module 800 integrates the significant patterns that represent node-to-graph features.

In one specific example of a purchase quotation scenario, a vendor A tries to provide an optimal quote for a purchase order based on a proposed inquiry list from customer B. The HGL system learns the knowledge of all the historical purchasing data from vendor A. In particular, the purchasing records that are from the same business area as customer B or with close geographic ties to customer B may be more heavily weighted as being relevant. In addition to the purchasing data from vendor A, other data may be collected, such as purchasing data from other vendors, historical purchasing data from customer B, to add additional context for the HGL system. In other words, the connected subgraphs may provide additional data to enable the HGL system to establish an optimal offer. To further exploit the context information among other vendors' graph data and customer B's previous competing offers, the semantic attention model may take advantage of gathering all the graph data to focus on the impactful quoting patterns.

Graph Embedding

Figure 9:
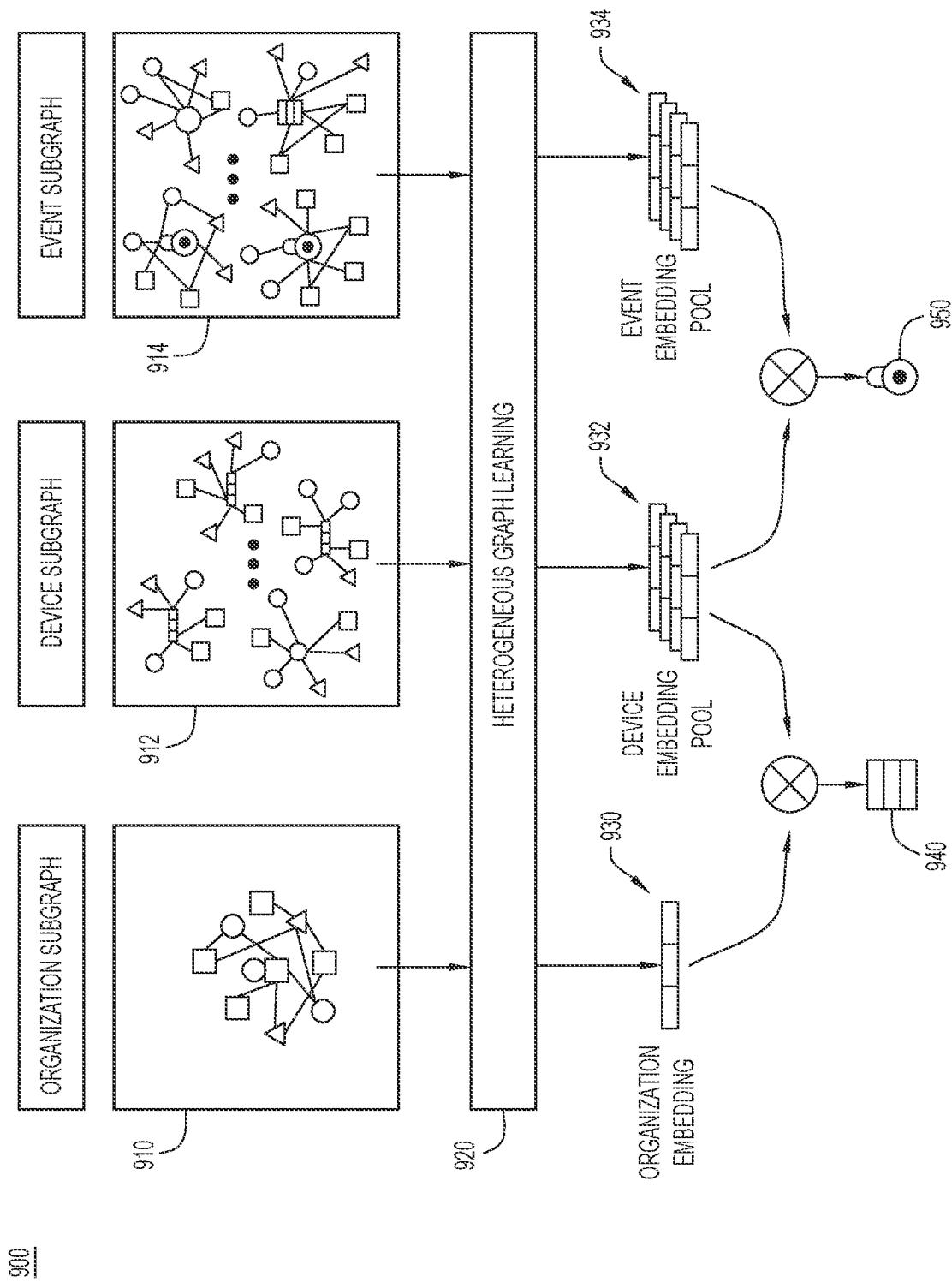
FIG. 9 is a diagram illustrating combining results of processing subgraphs of different node types with the heterogeneous graph learning model to generate probabilities and recommendations for user actions, according to an example embodiment.

Referring now to FIG. 9, an example of an HGL system 900 provides actionable data and predictions for different combinations of target nodes. The HGL system 900 is provided an organization node subgraph 910, device node subgraphs 912, and event node subgraphs 914 as targets. The HGL model 920 processes the target node subgraphs 910, 912, and 914 and generates embedding output results 930, 932, and 934, respectively. Each of the embedding output results 930, 932, and 934 project the respective target node into the feature space of the network implementations that trained the HGL model 920.

By combining the embedding output result 930 associated with the organization node subgraph 910 and the embedding output results 932 of the device node subgraphs 912, the HGL system 900 generates probabilities 940 that the organization associated with the organization node subgraph 910 will be able to benefit from using each device associated with the device node subgraphs 912. Similarly, by combining the embedding output result 932 associated with the device node subgraphs 912 and the embedding output results 934 of the event node subgraphs 914, the HGL system 900 generates probabilities 950 that each device associated with the device node subgraphs 912 will be associated with each event associated with the event node subgraphs 914. For instance, if the event node subgraphs 914 are related to security events, the probabilities 950 indicate the likelihood that a particular security event (e.g., an exploited security vulnerability) would occur at each particular device.

Given a target node and the correlated graph data as the input, the HGL system will output an embedding that captures the semantic context and the node-wise correlations to represent the target node in the features space. Considering the output embeddings of the HGL system directly reflect the latent patterns of the target nodes, the obtained embedding of the target node may be used in various real-world application scenarios. For instance, the probabilities 950 may indicate which device the organization is likely to add to their portfolio. A shorter distance between the organization embedding output result 930 and a particular device embedding output result from the results 932 indicates a higher probability that the organization will use that particular device. By projecting the embedding output results into probability space, the HGL system 900 may provide a recommendation of the optimal candidate for any specific graph data.

Use Case: Network Resource Allocation

Figure 10:
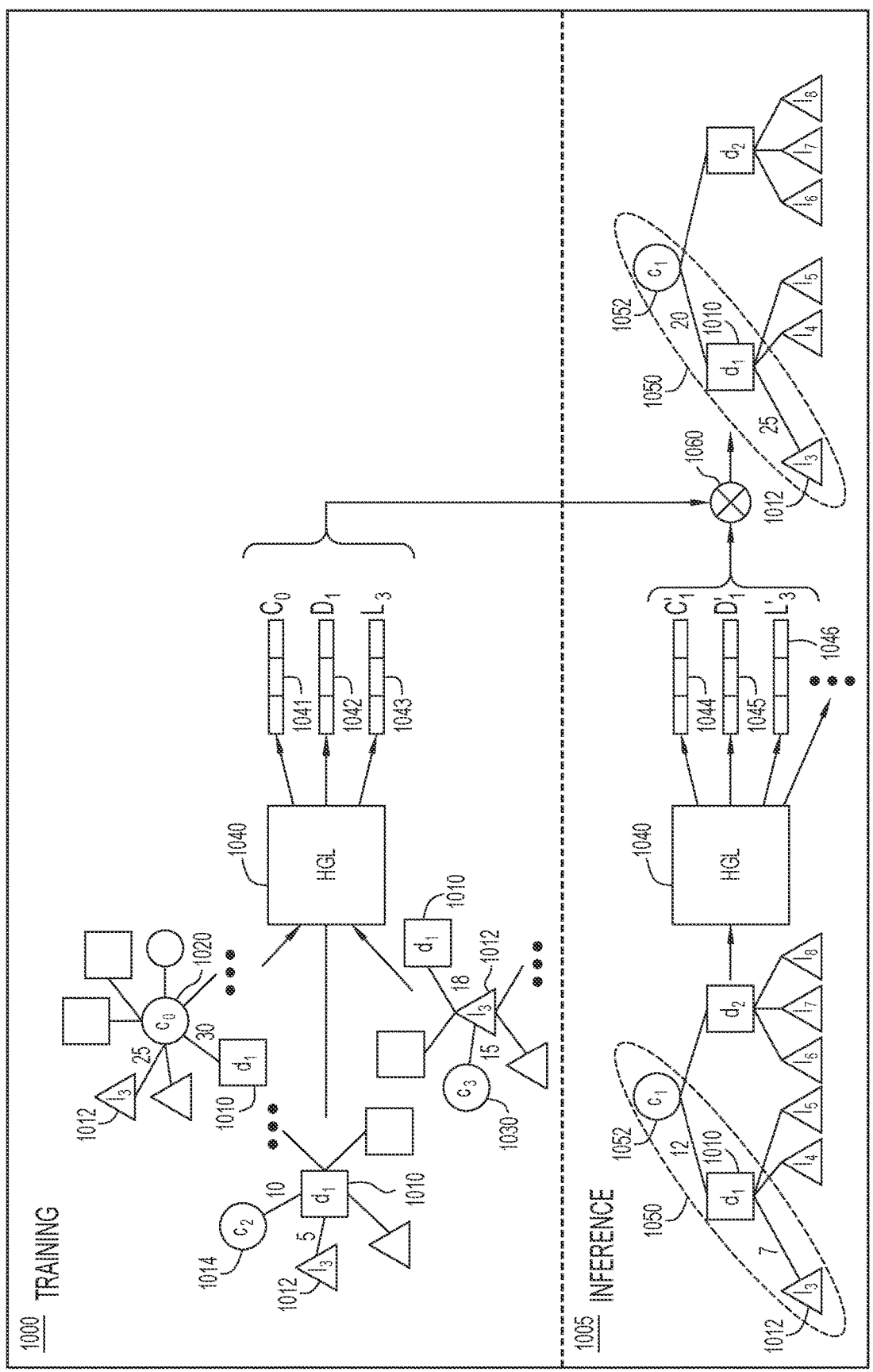
FIG. 10 is a diagram illustrating a use case for the heterogeneous graph learning model to optimize network resource allocation, according to an example embodiment.

Referring now to FIG. 10, an application scenario for optimally allocating network resources by utilizing the learned embeddings is shown. The HGL system includes a training phase 1000 and an inference phase 1005. In the training phase, various subgraphs are provided as input to the HGL model, which generates embedding output results that are provided to the inference phase 1005. A first input subgraph is centered around a device node 1010, and includes connections to a license node 1012 and an organization node 1014. A second input subgraph is centered around an organization node 1020, and includes a connection to the license node 1012. A third input subgraph is centered around the license node 1012, and includes connections to the device node 1010 and an organization node 1030.

The HGL model 1040 processes the input subgraphs centered around the organization node 1020, the device node 1010, and license node 1012, and generate embedding output results 1041, 1042, and 1043. The embedding output results 1041 correspond to the organization node 1020. The embedding output results 1042 correspond to the device node 1010. The embedding output results 1043 correspond to the license node 1012.

During the training phase, the network topologies, such as the subgraphs centered on device node 1010, organization node 1020, and license node 1012, are learned by the HGL model 1040. The outputs of the HGL model 1040 (e.g., embeddings 1041, 1042, and 1043) represent the semantic context and the node pair correlations. In one example, the output result 1041 embeds how many (indicated by the number on each edge) and what types of devices and software are connected to organization node 1020. Similarly, the embedding 1042 reflects what types of organizations, and how many peripherals and software (e.g., licenses) are usually associated with the device node 1010.

In one example, the embedded information quantitatively describes how the network resources are distributed with respect to customers, hardware, and software. In addition, the HGL system can capture the global semantic context from the heterogeneous graph, for example, though an organization C might not directly connect with a particular license 1, an indirect connection through the peripheral of device d could implicitly impact the organization C's capability to transfer resources to device d. The HGL system also updates the parameters of the HGL model to learn the lifecycle network topology since resource allocation is dynamic and progressive. For the same organization, different business contexts may call for different resource shifts.

In the inference phase, the HGL model 1040 processes an input subgraph 1050 that describes the current state of a network implementation. The subgraph 1050 includes an organization node 1052 that is connected to the device node 1010, which is also connected to the license node 1012. The edges between the organization node 1052, the device node 1020, and the license node 1012 are shown. In one example, the weights are the number of devices/licenses that are currently being used in the organization. In other words, the weight (e.g., 12) between the organization node 1052 and the device node 1010 shows a scenario in which organization $C_1$ uses 12 devices $d_1$. Similarly, the weight (e.g., 7) between the device node 1010 and the license node 1012 shows a scenario in which the organization $C_1$ holds 7 licenses $l_3$ for the 12 devices $d_1$.

The HGL model 1040 generates embedding output results 1044, 1045, and 1046 that represent the current state of the organization node 1052, device node 1010, and license node 1012, respectively. At 1060, the HGL system combines the current embeddings 1044, 1045, and 1046 with the optimal embeddings 1041, 1042, and 1043 generated in the training phase 1000. The resulting subgraph regenerates the input subgraph 1050 with updated edge weights that the trained HGL model 1040 determines are optimal based on the training phase 1000.

In one example, an organization's network portfolio (e.g., devices, services, licenses, etc.) are projected into the embedding space by the trained HGL model 1040. The HGL model 1040 has been trained in the training phase 1000 with the patterns and contexts of all of the historical graph data from multiple network implementations. As shown in FIG. 10, the network of the organization $C_1$ operates on network devices $d_i$ and $d_2$, which each connect to multiple software/licenses to support various network features. The existing resources (e.g., the edge weighting shown in FIG. 10) for the device $d_i$ and sub-connected licenses $l_3$ may not be optimally allocated. The HGL model processes the heterogeneous subgraph 1050 and modulates the graph data with the patterns and contexts learned in the training phase 1000 based on multiple network implementations.

As a result, the output embeddings 1044, 1045, and 1046 may be transformed to incorporate the prior knowledge of optimal network topologies centered on each node (i.e., organization node 1052, device node 1010, and license node 1012). To translate the embeddings 1044, 1045, and 1046 back to the graph space, an aggregation (e.g., elementwise multiplication) between the embeddings 1044, 1045, and 1046 and the historical embeddings 1041, 1042, and 1043 quantitatively reflect an optimal resource allocation. FIG. 10 shows the optimal resource allocation would be for the organization $C_1$ to increase the number of devices $d_i$ from 12 to 20 and increase the number of licenses $l_3$ from 7 to 25.

Beyond the intra-subgraph resource allocation, the HGL system may also enhance inter-subgraph resource allocation. For instance, if the device $d_i$ is deficient on licenses $l_5$ in terms of daily usage, and the device $d_2$ sits on multiple idle licenses $l_7$, then the organization $C_1$ may be expected to increase the number of licenses $l_5$ and decrease the number of licenses $l_7$. However, the business feature relying on the license $l_5$ may be dwindling in demand, which may cause the potential requests for license $l_7$ to increase due to expanding needs for device $d_2$. Since the HGL model 1040 incorporates the lifecycle dynamics of the network topology and semantic contexts, the optimal resource allocation may be predicted based on the relational graph data.

Use Case: Peer Knowledge Transfer

Another use case for the HGL system is to transfer peer knowledge, e.g., to guide new organizations with building their network portfolio or to help organizations optimize their existing network topologies. Since the HGL system effectively captures the semantic context and may be invariant to the network graph permutation, the embeddings of an input organization's network graph generated by the HGL model are automatically modulated by the patterns and contexts from the training network graphs.

Figure 11:
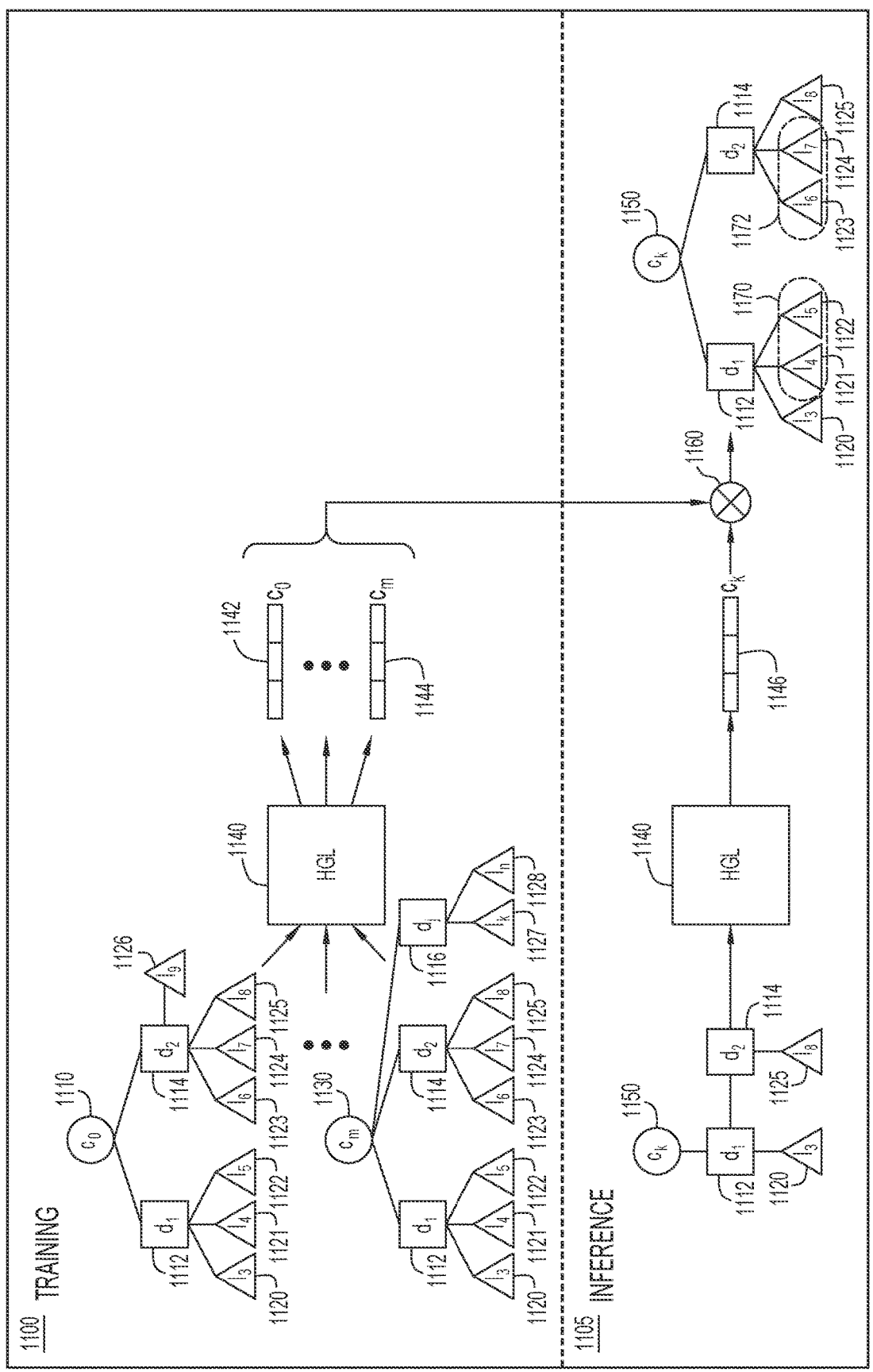
FIG. 11 is a diagram illustrating a use case for the heterogeneous graph learning model to facilitate peer knowledge transfer, according to an example embodiment.

Referring now to FIG. 11, the use case for peer knowledge transfer is shown with the training phase 1100 and the inference phase 1105. In the training phase 1100, a first subgraph describing the network implementation for an organization node 1110 is provided to the HGL model 1140. The organization node 1110 is connected to device nodes 1112 and 1114. In the first subgraph, the device node 1112 is connected to the license nodes 1120, 1121, and 1122. Similarly, in the first subgraph, the device node 1114 is connected to the license nodes 1123, 1124, 1125, and 1126.

A second subgraph describing the network implementation for an organization node 1130 is also provided to the HGL model 1140. The organization node 1130 is connected to device nodes 1112, 1114, and 1116. In the second subgraph, the device node 1112 is connected to the license nodes 1120, 1121, and 1122, and the device node 1114 is connected to the license nodes 1123, 1124, and 1125. The device node 1116 is connected to license nodes 1127 and 1128.

The HGL model 1140 processes the subgraphs describing the network implementation for the plurality of organizations, and generates embedding output result 1142 corresponding to the first subgraph for the organization node 1110 and embedding output result 1144 corresponding to the second subgraph for the organization node 1130. The embedding output results 1142 and 1144 are provided to the inference phase 1105 to transfer the knowledge and patterns of the network implementations for the first subgraph and the second subgraph for new organizations.

In the training phase 1100, multiple organizations with various network topologies are provided to the HGL model 1140 as a set of heterogeneous subgraphs. The HGL model 1140 extracts the most significant patterns from the input network graph data and projects the patterns into the embedding space. During this process, the HGL model 1140 parameterizes all of the network topologies and correlations, and the embedding output results reflect the semantic context among hardware, software, and services. The learned HGL model captures any latent patterns from a potentially vast source of network graph data. The interconnections (i.e., edges) of the subgraphs may be transformed into vectors to preserve the network topology.

In the inference phase 1105, a new subgraph focused on organization node 1150 is provided to the trained HGL model 1140. The organization node 1150 is connected to the device node 1112 and the device node 1114. In this input subgraph, the device node 1112 is connected to the license node 1120 and the device node 1114 is connected to the license node 1125. The HGL model 1140 processes the input subgraph for the organization node 1150 and generates an embedding output result 1146.

At 1160, the HGL system combines the embedding output result 1146 from the input subgraph with the embedding output results 1142 and 1144 generated in the training phase 1100 to recover a recommended network representation that incorporates the patterns from the training phase 1100 into the input subgraph of the organization node 1150. In the example shown in FIG. 11, the HGL system makes two recommendations 1170 and 1172 for the network representation of the organization node 1150. The recommendation 1170 adds license nodes 1121 and 1122 to the device node 1112. The recommendation 1172 adds the license nodes 1123 and 1124 to the device node 1114.

In one example, the input graph data centered on the organization node 1150 may describe a network implementation with insufficient resources. The network settings of peer organizations may help the organization node 1150 build their infrastructure with appropriate resources. For instance, the HGL model 1140 may be trained on multiple network graph configurations, and the patterns and knowledge from these network graphs may automatically complete the input network configuration optimization by modulating the input network graph based on the prior knowledge from the peer network graphs. In other words, the HGL model 1140 may help predict the potential device-to-device, device-to-license, and software-to-license connections and optimize the network graphs. Unlike a general peer comparison that transforms the network data without considering the nodes of different types or the contexts beyond the immediate connections, the HGL model 1140 uses both direct and indirect connections and retains the inter-subgraph features.

In the specific instance shown in FIG. 11, although the device nodes 1112 and 1114 are connected to the organization node 1150 separately, the device nodes 1112 and 1114 may affect each other in terms of license selection and capacities. In the HGL system, the incomplete network graph is converted into embeddings with all of the topologies preserved. By element-wise multiplication with other peers' network embeddings, the optimal choices of the organizations most similar to the organization node 1150 are selected to complete the input subgraph. In this instance, the automatically completed graph include the license nodes 1121, 1122, 1123, and 1124 based on the prior knowledge from other organizations and their respective network topologies.

Use Case: Security Issue Identification

Modelling network security (e.g., Product Security Incident Response Team (PSIRT, field notice, and bug reports) have proven challenging due to the explicit and implicit relationships among the issues and the heterogeneity of network infrastructure nodes. For instance, security issues may arise in a network management platform or in specific products/services. In addition to cloud and application security issues, endpoints are also vulnerable to attack. To better solve security issues across multiple platforms/services, the identification of the security issues (e.g., spam links, brute force login attacks, malware activity, unsecured logging leakage, etc.) enables more precise security alerting and enables the solutions to be more highly targeted.

Figure 12:
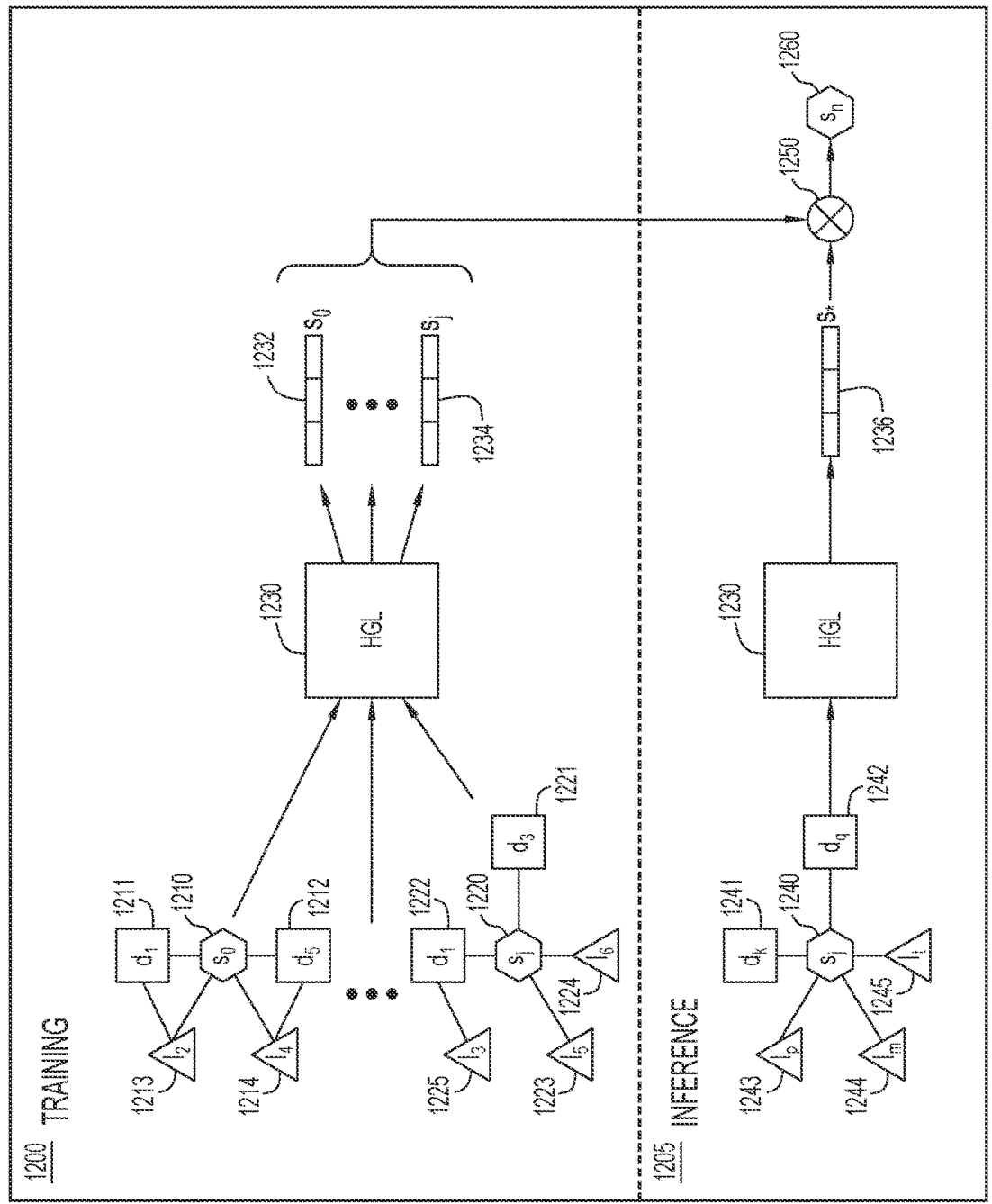
FIG. 12 is a diagram illustrating a use case for the heterogeneous graph learning model to identify security issues, according to an example embodiment.

Referring now to FIG. 12, the use case for identifying security issues is shown with the training phase 1200 and the inference phase 1205. In the training phase 1200, multiple subgraphs focused on security event nodes are provided to the HGL model 1230. The subgraphs include a first subgraph centered around a security event node 1210 and a second subgraph centered around a security event node 1220. The security event node 1210 is connected to device nodes 1211 and 1212 and license nodes 1213 and 1214. Similarly, the security event node 1220 is connected to device nodes 1221 and 1222 and license nodes 1223 and 1224. Additionally, the device node 1222 is connected to the license node 1225 in the second subgraph. The HGL model 1230 processes the subgraphs and generates embedding output results 1232 corresponding to the first subgraphs and embedding output result 1234 corresponding to the second subgraph.

In one example, the HGL model 1230 is built with a large number of security relations (e.g., PSIRT-device, PSIRT-software, field notice devices, PSIRT-network, etc.) between different types of network infrastructure nodes. The SSC methodology, as describe with respect to FIG. 6 enables the HGL system to enrich the semantic contexts of security issues. The clustered subgraphs centered on various security issues are provided as input to train the HGL model 1230, and the embedding output results 1232 and 1234 are provided according to the corresponding security issue labels.

In the inference phase 1205, a subgraph centered around an unknown security event node 1240 is provided to the HGL model 1230. The unknown security event node 1240 is connected to device nodes 1241 and 1242, and license nodes 1243, 1244, and 1245. The HGL model 1230 process the subgraph and generates an embedding output result 1236 that represents the network conditions of the unknow security event. At 1250, the embedding output result 1236 is combined with each of the embedding output results from the training phase 1200 (e.g., output results 1232 and 1234) and determines the most likely security event 1260 that is closest to the unknown security event node 1240.

In one example, the inference stage may provide a real-time security issue (e.g., a cyberattack) together with the connected hardware and software is sent to the HGL model 1230. The embedding output result 1236 reflects the network topology and semantic context of the security issue. By element-wise multiplication, with other security issue embedding output results, the HGL system finds the security event 1260 with the shortest distance to the security event node 1240 in the feature space of the network environment.

In the example shown in FIG. 12, hexagonal nodes represent security event, square boxes represent hardware devices, and orange triangles represent software licenses. The device nodes 1211, 1212, 1241, and 1242 may represent endpoint devices, local network devices, or centralized cloud network devices. The license nodes 1213, 1214, 1243, and 1244 may represent any type of software product or application.

Figure 13:
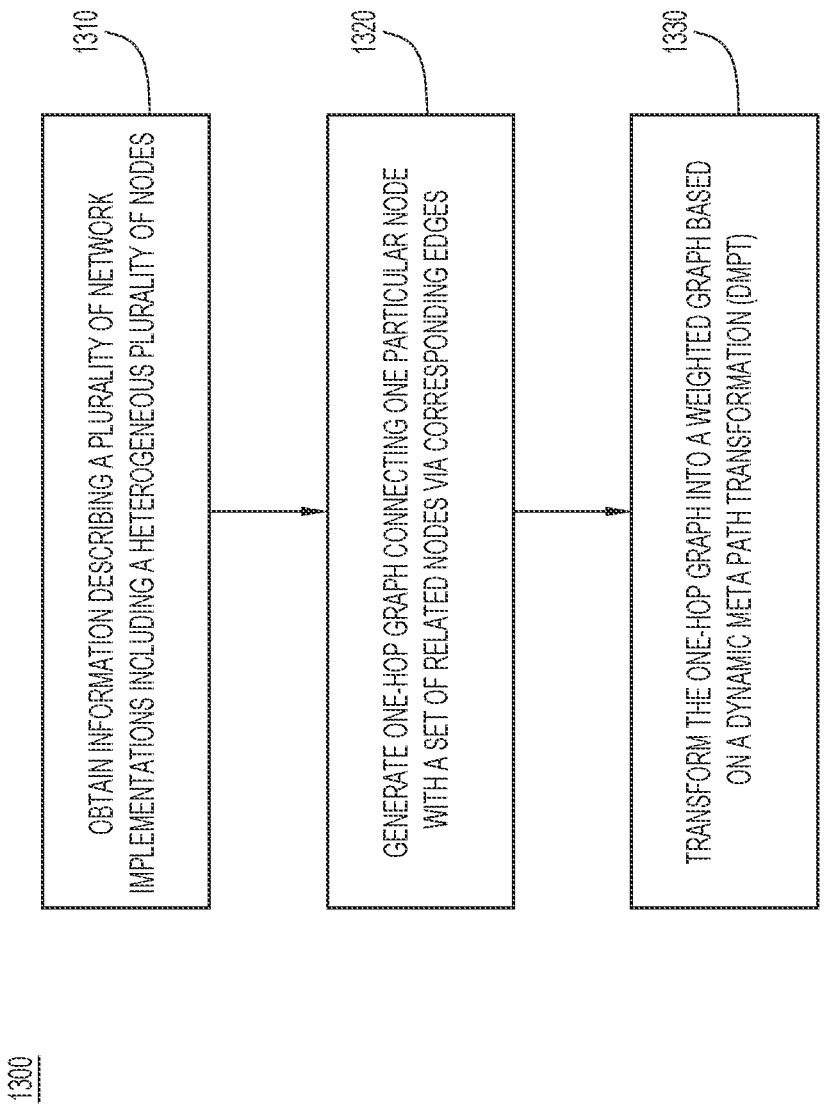
FIG. 13 is a flowchart illustrating a Dynamic Meta-Path Transformation (DMPT) process to generate a weighted subgraph for the heterogeneous graph learning model, according to an example embodiment.

Referring now to FIG. 13, a flowchart illustrates an example process 1300 for a cloud service provider to use a DMPT methodology in an HGL system. The service provider obtains information describing a plurality of network implementations at 1310. The information is provided as a heterogeneous plurality of nodes that are connected by edges. In one example, the nodes may include hardware nodes, software nodes, device nodes, license nodes, service nodes, and/or organization nodes.

At 1320, the service provider generates a one-hop graph connecting one particular node with a set of related nodes via corresponding edges. In one example, the particular node is an organization node that is connected to a set of related device nodes, software nodes, and license nodes that describe the network implementation of the network operated by the organization associated with the particular node. In another example, the particular node may be a device node connected to a related set of organization nodes (e.g., each associated with an organization that uses the particular device), software nodes (e.g., each associated with software packages that are deployed on the particular device), and/or license nodes (e.g., each associated with software licenses that are used in the operation of the particular device).

At 1330, the service provider transforms the one-hop graph into a weighted graph based on a Dynamic Meta Path Transformation (DMPT). In one example, the DMPT includes pruning and/or combining similar nodes among the set of related nodes. In another example, the DMPT includes generating a weighting transformation based on the node type of each node in the set of related nodes. As a result of the DMPT, the weighted graph includes a plurality of edges with weights associated with how close each node in the related set of nodes is to the particular node.

Figure 14:
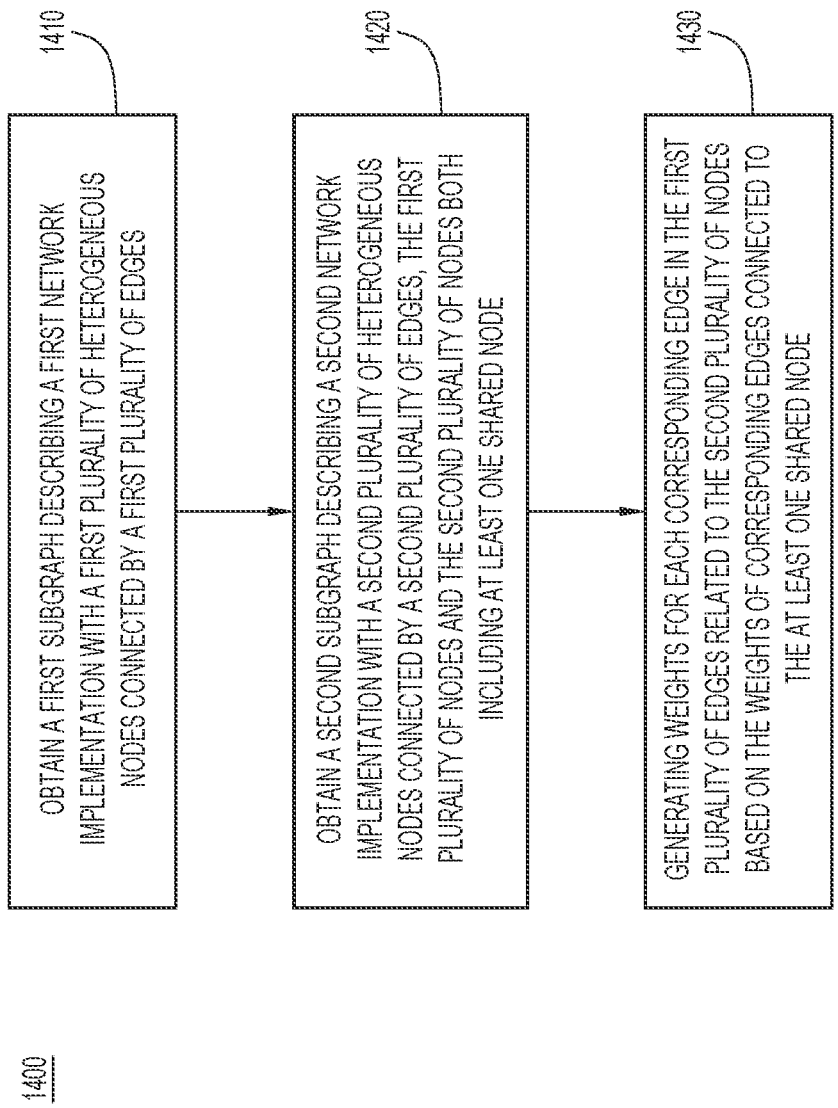
FIG. 14 is a flowchart illustrating a Soft Subgraph Clustering (SSC) process to adjust a weighted subgraph by incorporating context from other subgraphs that share one or more nodes, according to an example embodiment.

Referring now to FIG. 14, a flowchart illustrates an example process 1400 for a cloud service provider to use an SSC methodology in an HGL system. The service provider obtains a first subgraph describing a first network implementation at 1410. The first subgraph includes a first plurality of heterogeneous nodes connected by a first plurality of edges. In one example, the first subgraph may be centered on a particular node of the first plurality of heterogeneous nodes.

At 1420, the service provider obtains a second subgraph describing a second network implementation. The second subgraph includes a second plurality of heterogeneous nodes connected by a second plurality of edges. The first plurality of heterogeneous nodes and the second plurality of heterogeneous nodes both include at least one shared node. In one example, the second subgraph may be centered on a particular node of the plurality of heterogeneous nodes.

At 1430, the service provider generates weights for each corresponding edge in the first plurality of edges related to the second plurality of heterogeneous nodes based on the weights of corresponding edges connected to the at least one shared node. In one example, the service provider determines a partitioned weight for each edge in the first plurality of edges and the second plurality of edges. The partitioned weight represents the effect of the first plurality of heterogeneous nodes and the second plurality of heterogeneous nodes has on the corresponding edges.

Figure 15:
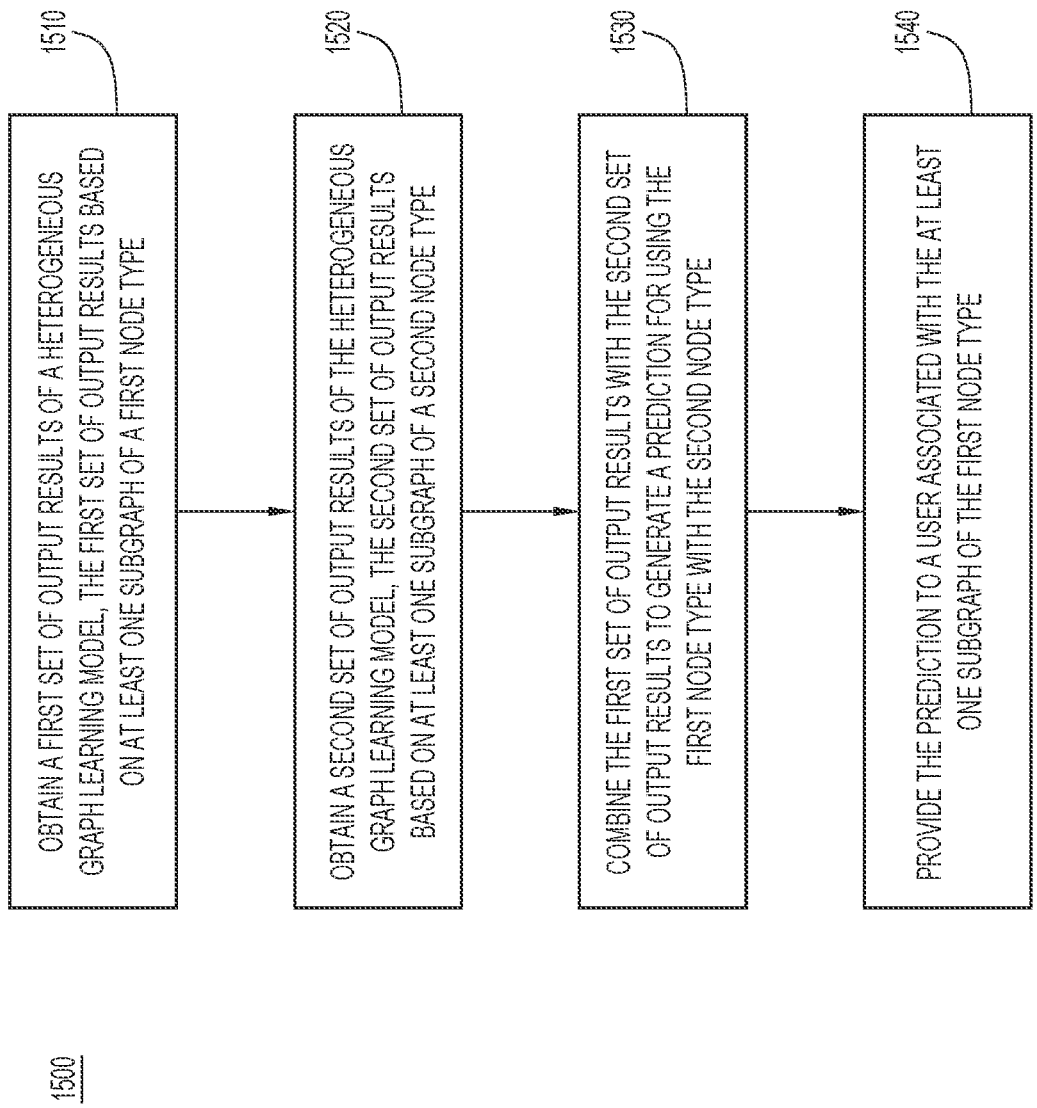
FIG. 15 is a flowchart illustrating a process for using the heterogeneous graph learning model to provide a prediction to a network operator, according to an example embodiment.

Referring now to FIG. 15, a flowchart illustrates an example process 1500 for a cloud service provider to provide predictions to a user based on network representations of similar network implementations. The service provider obtains a first set of output results from a heterogenous graph learning model at 1510. The first set of output results is based on at least one subgraph of a first node type. In other words, the first subgraph may be centered on a node with the first node type. In one example, the first node type may be an organization node. At 1520 the service provider obtains a second set of output results of the heterogeneous graph learning model. The second set of output results is based on at least one subgraph of a second node type. In one example, the second node type is a device node or a software node.

At 1530, the service provider combines the first set of output results with the second set of output results to generate a prediction for using the first node type with the second node type. In one example, the prediction may be that the organization associated with an organization node will benefit from using a device associated with a device node or a software package associated with a software node. The service provider provides the prediction to a user associated with the at least one subgraph of the first node type at 1540. In one example, the service provider provides the prediction that an organization will benefit from using a particular device or software package to a user responsible for implementing the organization's network infrastructure.

Figure 16:
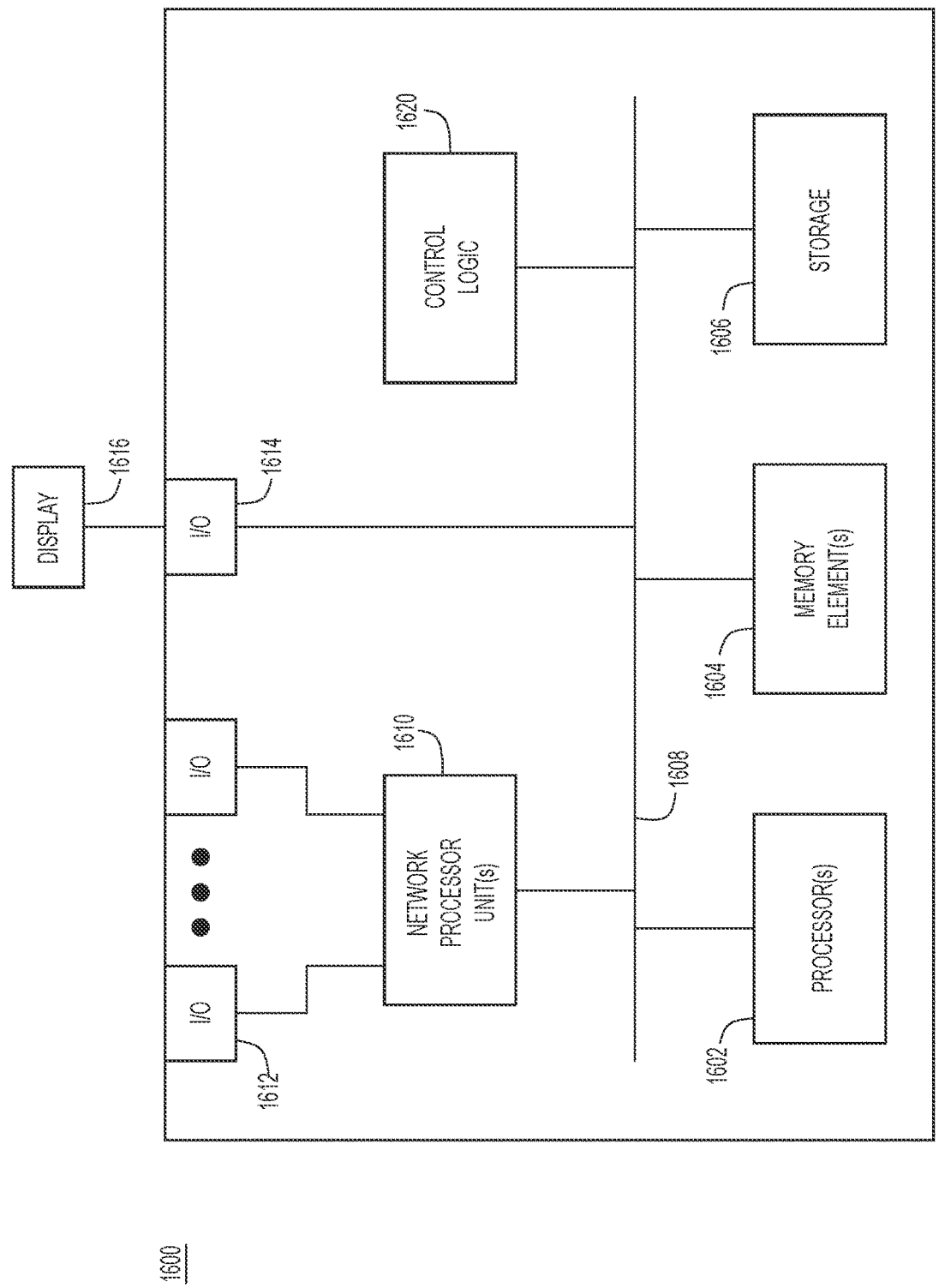
FIG. 16 is a hardware block diagram of a computing device that may perform functions associated with any combination of operations in connection with the techniques depicted and described in FIGS. 1-15, according to various example embodiments.

FIG. 16 is a hardware block diagram of a computing device 1600 that may perform functions associated with any combination of operations in connection with the techniques depicted in FIGS. 1-15, according to various example embodiments, including, but not limited to, operations of the computing device or one or more servers that execute the cloud portal 100 and/or the network representation service 120. Further, the computing device 1600 may be representative of one of the network devices, network/computing equipment, or hardware asset of an enterprise. It should be appreciated that FIG. 16 provides only an illustration of one example embodiment and does not imply any limitations with respect to the environments in which different example embodiments may be implemented. Many modifications to the depicted environment may be made.

In at least one embodiment, computing device 1600 may include one or more processor(s) 1602, one or more memory element(s) 1604, storage 1606, a bus 1608, one or more network processor unit(s) 1610 interconnected with one or more network input/output (I/O) interface(s) 1612, one or more I/O interface(s) 1614, and control logic 1620. In various embodiments, instructions associated with logic for computing device 1600 can overlap in any manner and are not limited to the specific allocation of instructions and/or operations described herein.

In at least one embodiment, processor(s) 1602 is/are at least one hardware processor configured to execute various tasks, operations and/or functions for computing device 1600 as described herein according to software and/or instructions configured for computing device 1600. Processor(s) 1602 (e.g., a hardware processor) can execute any type of instructions associated with data to achieve the operations detailed herein. In one example, processor(s) 1602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1604 and/or storage 1606 is/are configured to store data, information, software, and/or instructions associated with computing device 1600, and/or logic configured for memory element(s) 1604 and/or storage 1606. For example, any logic described herein (e.g., control logic 1620) can, in various embodiments, be stored for computing device 1600 using any combination of memory element(s) 1604 and/or storage 1606. Note that in some embodiments, storage 1606 can be consolidated with one or more memory elements 1604 (or vice versa), or can overlap/exist in any other suitable manner.

In at least one embodiment, bus 1608 can be configured as an interface that enables one or more elements of computing device 1600 to communicate in order to exchange information and/or data. Bus 1608 can be implemented with any architecture designed for passing control, data and/or information between processors, memory elements/storage, peripheral devices, and/or any other hardware and/or software components that may be configured for computing device 1600. In at least one embodiment, bus 1608 may be implemented as a fast kernel-hosted interconnect, potentially using shared memory between processes (e.g., logic), which can enable efficient communication paths between the processes.

In various embodiments, network processor unit(s) 1610 may enable communication between computing device 1600 and other systems, entities, etc., via network I/O interface(s) 1612 to facilitate operations discussed for various embodiments described herein. In various embodiments, network processor unit(s) 1610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1600 and other systems, entities, etc. to facilitate operations for various embodiments described herein. In various embodiments, network I/O interface(s) 1612 can be configured as one or more Ethernet port(s), Fibre Channel ports, and/or any other I/O port(s) now known or hereafter developed. Thus, the network processor unit(s) 1610 and/or network I/O interface(s) 1612 may include suitable interfaces for receiving, transmitting, and/or otherwise communicating data and/or information in a network environment.

I/O interface(s) 1614 allow for input and output of data and/or information with other entities that may be connected to computing device 1600. For example, I/O interface(s) 1614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 1616 such as a computer monitor, a display screen, or the like.

In various embodiments, control logic 1620 can include instructions that, when executed, cause processor(s) 1602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1620) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1606 and/or memory elements(s) 1604 can store data, software, code, instructions (e.g., processor instructions), logic, parameters, combinations thereof, and/or the like used for operations described herein. This includes the storage 1606 and/or memory elements(s) 1604 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein provide for a heterogeneous graph learning system based on dynamic meta-path transformation, soft subgraph clustering and hierarchical attention aggregation to represent a large-scale text and knowledge base network graph. These techniques use intra-subgraph and inter-subgraph semantic contexts to comprehensively evaluate network topologies and facilitate multiple downstream tasks. The tasks may include network resource allocation, peer knowledge transfer, and security issue identification.

The techniques presented herein include a customer-centric and product-centric graph pruning and transformation method that a scalable to large network data representations. Additionally, a unified node-wise and subgraph-wise clustering method leverage the local and global contexts of the heterogeneous network graph. The hierarchical attention aggregation process ensembles knowledge and extracts patterns to facilitate downstream tasks in the network domain. A learning system based on a graph neural network supports knowledge transference among network graph permutations.

In some aspects, the techniques described herein relate to a method including: obtaining information describing a plurality of network implementations, the information including a heterogeneous plurality of nodes; generating a one-hop graph connecting a particular node of the heterogeneous plurality of nodes with a set of related nodes of the heterogeneous plurality of nodes, the one-hop graph connecting the particular node with the set of related nodes via corresponding edges; and transforming the one-hop graph into a weighted graph based on a DMPT, wherein each of the corresponding edges connecting the particular node to a corresponding related node among the set of related nodes is associated with a corresponding weight.

In some aspects, the techniques described herein relate to a method, wherein the heterogeneous plurality of nodes includes nodes representing a plurality of node types selected from a group consisting of hardware nodes, software nodes, device nodes, service nodes, license nodes, event nodes, and organization nodes.

In some aspects, the techniques described herein relate to a method, wherein the DMPT includes pruning one or more of the corresponding edges based on redundancy.

In some aspects, the techniques described herein relate to a method, wherein the DMPT includes merging one or more nodes in the set of related nodes based on the one or more nodes having similar features.

In some aspects, the techniques described herein relate to a method, wherein the DMPT includes determining a weighting transformation for each corresponding edge based on a node type of the corresponding related node.

In some aspects, the techniques described herein relate to a method, further including: generating a plurality of weighted graphs corresponding to a plurality of nodes in the heterogeneous plurality of nodes; and combining the plurality of weighted graphs to generate a subgraph of nodes representing a particular network implementation among the plurality of network implementations.

In some aspects, the techniques described herein relate to a method, further including: generating a plurality of subgraphs representing the plurality of network implementations; and performing soft subgraph clustering for subgraphs among the plurality of subgraphs that share one or more common nodes to adjust corresponding weights of the corresponding edges.

In some aspects, the techniques described herein relate to an apparatus including: a memory; a network interface configured to enable network communications; and a processor, wherein the processor is configured to perform a method including: obtaining information describing a plurality of network implementations, the information including a heterogeneous plurality of nodes; generating a one-hop graph connecting a particular node of the heterogeneous plurality of nodes with a set of related nodes of the heterogeneous plurality of nodes, the one-hop graph connecting the particular node with the set of related nodes via corresponding edges; and transforming the one-hop graph into a weighted graph based on a DMPT, wherein each of the corresponding edges connecting the particular node to a corresponding related node among the set of related nodes is associated with a corresponding weight.

In some aspects, the techniques described herein relate to an apparatus, wherein the heterogeneous plurality of nodes includes nodes representing a plurality of node types selected from a group consisting of hardware nodes, software nodes, device nodes, service nodes, license nodes, event nodes, and organization nodes.

In some aspects, the techniques described herein relate to an apparatus, wherein the DMPT includes pruning one or more of the corresponding edges based on redundancy.

In some aspects, the techniques described herein relate to an apparatus, wherein the DMPT includes merging one or more nodes in the set of related nodes based on the one or more nodes having similar features.

In some aspects, the techniques described herein relate to an apparatus, wherein the DMPT includes determining a weighting transformation for each corresponding edge based on a node type of the corresponding related node.

In some aspects, the techniques described herein relate to an apparatus, wherein the processor is further configured to perform: generating a plurality of weighted graphs corresponding to a plurality of nodes in the heterogeneous plurality of nodes; and combining the plurality of weighted graphs to generate a subgraph of nodes representing a particular network implementation among the plurality of network implementations.

In some aspects, the techniques described herein relate to an apparatus, wherein the processor is further configured to perform: generating a plurality of subgraphs representing the plurality of network implementations; and performing soft subgraph clustering for subgraphs among the plurality of subgraphs that share one or more common nodes to adjust corresponding weights of the corresponding edges.

In some aspects, the techniques described herein relate to one or more non-transitory computer readable storage media encoded with software including computer executable instructions that, when executed by a processor, cause the processor to perform a method including: obtaining information describing a plurality of network implementations, the information including a heterogeneous plurality of nodes; generating a one-hop graph connecting a particular node of the heterogeneous plurality of nodes with a set of related nodes of the heterogeneous plurality of nodes, the one-hop graph connecting the particular node with the set of related nodes via corresponding edges; and transforming the one-hop graph into a weighted graph based on a DMPT, wherein each of the corresponding edges connecting the particular node to a corresponding related node among the set of related nodes is associated with a corresponding weight.

In some aspects, the techniques described herein relate to one or more non-transitory computer readable storage media, wherein the heterogeneous plurality of nodes includes nodes representing a plurality of node types selected from a group consisting of hardware nodes, software nodes, device nodes, service nodes, license nodes, event nodes, and organization nodes.

In some aspects, the techniques described herein relate to one or more non-transitory computer readable storage media, wherein the DMPT includes pruning one or more of the corresponding edges based on redundancy.

In some aspects, the techniques described herein relate to one or more non-transitory computer readable storage media, wherein the DMPT includes merging one or more nodes in the set of related nodes based on the one or more nodes having similar features.

In some aspects, the techniques described herein relate to one or more non-transitory computer readable storage media, wherein the DMPT includes determining a weighting transformation for each corresponding edge based on a node type of the corresponding related node.

In some aspects, the techniques described herein relate to one or more non-transitory computer readable storage media, wherein the computer executable instructions cause the processor to further perform: generating a plurality of weighted graphs corresponding to a plurality of nodes in the heterogeneous plurality of nodes; and combining the plurality of weighted graphs to generate a subgraph of nodes representing a particular network implementation among the plurality of network implementations.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining information describing a plurality of network implementations, the information including a heterogeneous plurality of nodes;
    generating a one-hop graph connecting a particular node of the heterogeneous plurality of nodes with a set of related nodes of the heterogeneous plurality of nodes, the one-hop graph connecting the particular node with the set of related nodes via corresponding edges; and
    transforming the one-hop graph into a weighted graph based on a Dynamic Meta Path Transformation (DMPT), wherein each of the corresponding edges connecting the particular node to a corresponding related node among the set of related nodes is associated with a corresponding weight.

2. The method of claim 1, wherein the heterogeneous plurality of nodes includes nodes representing a plurality of node types selected from a group consisting of hardware nodes, software nodes, device nodes, service nodes, license nodes, event nodes, and organization nodes.

3. The method of claim 1, wherein the DMPT comprises pruning one or more of the corresponding edges based on redundancy.

4. The method of claim 1, wherein the DMPT comprises merging one or more nodes in the set of related nodes based on the one or more nodes having similar features.

5. The method of claim 1, wherein the DMPT comprises determining a weighting transformation for each corresponding edge based on a node type of the corresponding related node.

6. The method of claim 1, further comprising:
    generating a plurality of weighted graphs corresponding to a plurality of nodes in the heterogeneous plurality of nodes; and
    combining the plurality of weighted graphs to generate a subgraph of nodes representing a particular network implementation among the plurality of network implementations.

7. The method of claim 6, further comprising:
    generating a plurality of subgraphs representing the plurality of network implementations; and
    performing soft subgraph clustering for subgraphs among the plurality of subgraphs that share one or more common nodes to adjust corresponding weights of the corresponding edges.

8. An apparatus comprising:
    a memory;
    a network interface configured to enable network communications; and
    a processor, wherein the processor is configured to perform a method comprising:
        obtaining information describing a plurality of network implementations, the information including a heterogeneous plurality of nodes;
        generating a one-hop graph connecting a particular node of the heterogeneous plurality of nodes with a set of related nodes of the heterogeneous plurality of nodes, the one-hop graph connecting the particular node with the set of related nodes via corresponding edges; and
        transforming the one-hop graph into a weighted graph based on a Dynamic Meta Path Transformation (DMPT), wherein each of the corresponding edges connecting the particular node to a corresponding related node among the set of related nodes is associated with a corresponding weight.

9. The apparatus of claim 8, wherein the heterogeneous plurality of nodes includes nodes representing a plurality of node types selected from a group consisting of hardware nodes, software nodes, device nodes, service nodes, license nodes, event nodes, and organization nodes.

10. The apparatus of claim 8, wherein the DMPT comprises pruning one or more of the corresponding edges based on redundancy.

11. The apparatus of claim 8, wherein the DMPT comprises merging one or more nodes in the set of related nodes based on the one or more nodes having similar features.

12. The apparatus of claim 8, wherein the DMPT comprises determining a weighting transformation for each corresponding edge based on a node type of the corresponding related node.

13. The apparatus of claim 8, wherein the processor is further configured to perform:
    generating a plurality of weighted graphs corresponding to a plurality of nodes in the heterogeneous plurality of nodes; and
    combining the plurality of weighted graphs to generate a subgraph of nodes representing a particular network implementation among the plurality of network implementations.

14. The apparatus of claim 13, wherein the processor is further configured to perform:
    generating a plurality of subgraphs representing the plurality of network implementations; and
    performing soft subgraph clustering for subgraphs among the plurality of subgraphs that share one or more common nodes to adjust corresponding weights of the corresponding edges.

15. One or more non-transitory computer readable storage media encoded with software comprising computer executable instructions that, when executed by a processor, cause the processor to perform a method including:
    obtaining information describing a plurality of network implementations, the information including a heterogeneous plurality of nodes;
    generating a one-hop graph connecting a particular node of the heterogeneous plurality of nodes with a set of related nodes of the heterogeneous plurality of nodes, the one-hop graph connecting the particular node with the set of related nodes via corresponding edges; and
    transforming the one-hop graph into a weighted graph based on a Dynamic Meta Path Transformation (DMPT), wherein each of the corresponding edges connecting the particular node to a corresponding related node among the set of related nodes is associated with a corresponding weight.

16. The one or more non-transitory computer readable storage media according to claim 15, wherein the heterogeneous plurality of nodes includes nodes representing a plurality of node types selected from a group consisting of hardware nodes, software nodes, device nodes, service nodes, license nodes, event nodes, and organization nodes.

17. The one or more non-transitory computer readable storage media according to claim 15, wherein the DMPT comprises pruning one or more of the corresponding edges based on redundancy.

18. The one or more non-transitory computer readable storage media according to claim 17, wherein the computer executable instructions cause the processor to further perform:
- generating a plurality of weighted graphs corresponding to a plurality of nodes in the heterogeneous plurality of nodes; and
- combining the plurality of weighted graphs to generate a subgraph of nodes representing a particular network implementation among the plurality of network implementations.

19. The one or more non-transitory computer readable storage media according to claim 15, wherein the DMPT comprises merging one or more nodes in the set of related nodes based on the one or more nodes having similar features.

20. The one or more non-transitory computer readable storage media according to claim 15, wherein the DMPT comprises determining a weighting transformation for each corresponding edge based on a node type of the corresponding related node.

* * * * *